United States Patent
Dasgupta et al.

(10) Patent No.: US 7,548,047 B1
(45) Date of Patent: Jun. 16, 2009

(54) PULSE WIDTH MODULATED BUCK VOLTAGE REGULATOR WITH STABLE FEEDBACK CONTROL LOOP

(75) Inventors: Uday Dasgupta, Singapore (SG); Rudy Kurniawan, Singapore (SG); Yayue Zhang, Singapore (SG)

(73) Assignee: Marvell International Ltd. (BM)

( * ) Notice: Subject to any disclaimer, the term of this patent is extended or adjusted under 35 U.S.C. 154(b) by 285 days.

(21) Appl. No.: 11/293,319

(22) Filed: Dec. 1, 2005

Related U.S. Application Data

(60) Provisional application No. 60/677,779, filed on May 3, 2005.

(51) Int. Cl.
*G05F 1/00* (2006.01)

(52) U.S. Cl. .................. 323/283; 323/284; 323/286; 323/287

(58) Field of Classification Search ............... 323/282, 323/283, 284, 286, 287
See application file for complete search history.

(56) References Cited

U.S. PATENT DOCUMENTS

| | | | | |
|---|---|---|---|---|
| 4,054,820 A | * | 10/1977 | Foster | 318/603 |
| 4,384,321 A | * | 5/1983 | Rippel | 363/124 |
| 4,575,668 A | * | 3/1986 | Baker | 318/811 |
| 5,079,498 A | * | 1/1992 | Cleasby et al. | 323/283 |
| 5,245,520 A | * | 9/1993 | Imbertson | 363/17 |
| 5,625,279 A | * | 4/1997 | Rice et al. | 323/283 |
| 5,629,610 A | * | 5/1997 | Pedrazzini et al. | 323/283 |
| 6,016,258 A | * | 1/2000 | Jain et al. | 363/17 |
| 6,204,651 B1 | * | 3/2001 | Marcus et al. | 323/283 |
| 6,960,960 B2 | * | 11/2005 | Ishiwaki | 331/1 R |
| 6,979,982 B2 | * | 12/2005 | Herbert | 323/272 |
| 2001/0033504 A1 | * | 10/2001 | Galbiati et al. | 363/98 |
| 2001/0038303 A1 | * | 11/2001 | Nomura | 327/112 |
| 2002/0015458 A1 | * | 2/2002 | Van Sinderen | 375/345 |
| 2004/0008016 A1 | * | 1/2004 | Sutardja et al. | 323/283 |
| 2004/0196013 A1 | * | 10/2004 | Chen et al. | 323/282 |
| 2004/0207376 A1 | * | 10/2004 | Hong et al. | 323/283 |
| 2004/0227497 A1 | * | 11/2004 | Asanuma et al. | 323/283 |
| 2005/0184824 A1 | * | 8/2005 | Govind | 333/32 |
| 2006/0279966 A1 | * | 12/2006 | Fan et al. | 363/17 |

* cited by examiner

*Primary Examiner*—Akm E Ullah
*Assistant Examiner*—Arun Williams

(57) ABSTRACT

A pulse-width modulated buck regulator includes a feedback control without having any external frequency compensation components to stabilize the feedback control loop irrespective of the reactive component of its load impedance. Additionally, the output voltage is maintained constant not only with feedback but also using a power supply voltage compensation scheme. Thus, the feedback control compensates for resistive losses, thus minimizing hardware. The output voltage is compared with first and second reference voltages. If the output voltage is greater than the first reference voltage, a counter's count is decremented. If the output voltage is less than the second reference voltage, the counter's count is incremented. The counter is disabled if the output voltage is smaller than the first reference voltage and greater than the second reference voltage. The duty cycle of the output voltage is varied in accordance with the counter's count.

35 Claims, 16 Drawing Sheets

PULSE WIDTH MODULATED BUCK VOLTAGE REGULATOR WITH STABLE FEEDBACK CONTROL LOOP

CROSS-REFERENCES TO RELATED APPLICATIONS

The present application claims benefit under 35 USC 119 (e) of U.S. provisional application No. 60/677,779, filed May 3, 2005, entitled "PWM Buck Regulator With Minimal Feedback Control Range", the content of which is incorporated herein by reference in its entirety.

BACKGROUND OF THE INVENTION

The present invention relates to electronic circuits, and more particularly to conversion of supply voltages used in such circuits.

In integrated circuits (IC), there is often a need to generate a lower DC voltage from a higher DC supply voltage. One known circuit for achieving this is commonly referred to as pulse width modulated (PWM) buck regulator, a simplified block diagram of which is shown in FIG. 1. PWM buck regulator 100 of FIG. 1 is shown as including, in part, a PWM signal generator 105, a driver 110, and an analog feedback control loop 115. Feedback control loop 115, in turn, includes a comparator 125, and a frequency compensator 120. Supply voltage $V_{DD}$ is pulse-width modulated by PWM buck regulator 100 and is subsequently supplied as output voltage signal $V_{OUT}$. LC filter 130 is adapted to filter out the high frequency components of noise of voltage signal $V_{OUT}$. Both LC filter 130 and resistive load 140 are typically external to PWM buck regulator 100.

Feedback control loop 115 is adapted to maintain $V_{OUT}$ nearly equal to reference voltage $V_R$ and further to maintain stability in the loop. Frequency compensator 120 is sensitive to variations in the reactive loads present at node 135 carrying signal $V_{OUT}$. Therefore, frequency compensator 120 is typically difficult to design and often requires components external to PWM buck regulator 100 if the external load seen by node 135 is not purely resistive. Such external components increase both the complexity as well as the cost of PWM buck regulator 100. PWM signal generator 105 is shown as including an oscillator 102, and a comparator 104.

FIG. 2 is a simplified block diagram of RC oscillator 102 of FIG. 1, as known in the prior art. If signals Q and $\overline{Q}$ are respectively at logic low and high states, switch 166 is open and switch 164 is closed, causing current source 150 to charge capacitor 168 thereby to increase voltage $V_M$. If signals Q and $\overline{Q}$ are respectively at logic high and low states, switch 166 is closed and switch 164 is open, causing current source 152 to discharge capacitor 168 thereby to decrease voltage $V_M$. Latch 165 is set or reset in response to the comparison operations performed by comparators 156 and 158. As seen from FIG. 2, comparator 156 compares voltage $V_M$ with the high reference voltages $V_H$, and comparator 158 compares voltage $V_M$ with the low reference voltages $V_L$.

FIG. 3A shows the variations in voltage $V_M$ as a function of time. FIG. 3B shows the change in the logic states of signals Q and $\overline{Q}$ as a function of time. Time periods $T_1$ and $T_2$ shown in FIGS. 3A and 3B are defined by the following equations:

$$T_1 = \frac{C}{I_1}(V_H - V_L)$$

$$T_2 = \frac{C}{I_2}(V_H - V_L)$$

where C is the capacitance of capacitor 168, $I_1$ is the current that flow through current source 150, and $I_1$ is the current that flow through current source 152.

To overcome the above-described drawbacks of PWM buck regulator 100, PWM buck regulator with hysteretic control has been developed. FIG. 4 is a simplified high-level block diagram of a hysteretic PWM buck regulator 200, as known in the prior art. Hysteretic PWM buck regulator 200 includes, in part, a driver 210 and a hysteresis comparator 220. RC filter 230 and resistive load 240 are external components. The high frequency component of the noise generated by driver 210 is filtered by LC filter 230 and is supplied as output voltage signal $V_{OUT}$ via node 235.

Hysteretic PWM buck regulator 200 is operative to self-oscillate. As shown in FIG. 5A, output voltage $V_{OUT}$ varies between and is nearly equal to the average of voltage levels $V_H$ and $V_L$—applied to the two input terminals of hysteresis comparator 220. Due, in part, to the DC offset of hysteresis comparator 220, it is relatively difficult to keep voltage levels $V_H$ and $V_L$ close to one another. Furthermore, as is known, it is desirable to operate hysteretic PWM buck regulator 200 at relatively high frequencies to keep the values of the capacitor 232, and inductor 234 disposed in LC filter 230 small. As the frequency of operation increases, the delay across hysteresis comparator 220 causes output voltage Vout to overshoot $V_H$ and undershoot $V_L$, as shown in FIG. 5B, thereby further increasing the ripple at the output voltage and rendering it difficult to control.

BRIEF SUMMARY OF THE INVENTION

In accordance with one embodiment of the present invention, both the duty cycle and the frequency of an output voltage signal are regulated by a PWM buck regulator. To achieve this, the output voltage is compared with first and second reference voltages. If the output voltage is detected as being greater than the first reference voltage, a counter's count is decremented with each transition of a clock signal. If the output voltage is detected as being less than the second reference voltage, the counter's count is incremented with each transition of the clock signal. The counter is disabled if the output voltage is detected as being smaller than the first reference voltage and greater than the second reference voltage. The duty cycle of the output voltage is varied in accordance with the counter's count, increasing as the counter's count is incremented and decreasing as the counter's count is decremented. The PWM buck regulator includes a feedback control without having any external frequency compensation components to stabilize the feedback control loop irrespective of the reactive component of its load impedance. Additionally, the output voltage is maintained constant not only with feedback but also using a power supply voltage compensation scheme. Thus, the feedback control compensates for resistive losses, thus minimizing hardware.

To ensure that transient fluctuations on the output voltage signal are dissipated and that the output voltage signal is settled to its new value as it is compared to the first and second reference voltages, the frequency of the output voltage signal is divided by a number greater than one. The signal having the divide frequency is the clock signal applied to the counter.

The duty cycle of the output voltage signal is varied by varying the charge and/or discharge time of a capacitor disposed in a pulse-width modulated signal generator. The pulse-width modulated signal generator includes a multitude of legs each of which includes a first transistor adapted charge to the capacitor when a first switch associated with the first transistor is selected to be closed, and a second transistor adapted discharge the capacitor when a second switch associated with the second transistor is selected to be closed. The first and second switches disposed in each leg are configured so as not be concurrently selected. The counter's count is used as a control signal that selectively opens and closes such switches to vary the amount of charging and/or discharging current of the capacitor thereby to vary the duty cycle of the output signal. When no duty cycle adjustment is required, the switches disposed in all the legs are selected to be open. In one embodiment, the charging and discharging currents flowing through each of the legs are respectively factions of a reference charging current and a reference discharging current established by a pair of amplifiers that receive a reference voltage that decides the output voltage signal at their inverting input terminals.

A frequency compensation circuit further compensates for the variations in the frequency of the output voltage signal. The frequency compensation circuit includes, in part, a string of resistors—each having the same resistance—is disposed between a multitude of tapped nodes. A frequency control signal selectively opens and closes a multitude of switches connected to the tapped nodes so as to deliver first and second control signals carried by the nodes that are mirror image nodes with respect to the center tapped node of the resistor string. If the first control signal is detected as being greater than a third reference voltage, the capacitor is enabled to be discharged. If the second control signal is detected as being smaller than a fourth reference voltage, the capacitor is enabled to be charged. The first and second control signals are latched and are used to generate a pair of non-overlapping signals that are applied to a pair of transistors adapted to drive a filter.

To minimize the ringing of the filter so as to minimize fluctuations in the output voltage signal, a set signal and a reset signal are generated, both of which are used to control the generation of the non-overlapping signals. The reset signal is generated if the output voltage signal is detected as being greater than a fifth reference voltage. The set signal is generated if the output voltage signal is detected as being less than a sixth reference voltage.

In accordance with one embodiment of the present invention, a pulse-width modulated buck regulator, includes, in part, means for decrementing a count with each transition of a clock signal if the output voltage of the buck regulator is above a first reference voltage, means for incrementing the count with each transition of the clock signal if the output voltage is below a second reference voltage, means for maintaining the count if the output voltage falls between the first and second reference voltages, and means for changing the duty cycle of a first signal in accordance with the count. The output voltage is generated in response to the first signal, and the clock signal has a frequency that is 1/N times the frequency of the first signal, where N is greater than one.

The pulse-width modulated buck regulator of such embodiments further includes, in part, means for varying one of charging time and discharging time of a capacitor in response to the count, means for supplying a current that is S1 times a reference charging current to the capacitor via at least one of M legs during a first time period thereby to decrease the charging time of the capacitor, means for sinking a current that is S2 times a reference discharging current to the capacitor via at least one of the M legs during a second time period thereby to decrease the discharging time of the capacitor. The first and second time periods do not overlap and each of S1 and S2 is smaller than one. Each of the M legs is adapted to supply current to the capacitor or sink current from the capacitor in response to a different one of binary weighted signals.

The pulse-width modulated buck regulator of such embodiments further includes, in part, means for generating the reference charging current in response to a voltage representative of the output voltage, means for generating the reference discharging current in response to the voltage representative of the output voltage, means for tapping a first node supplying a third reference voltage, and means for tapping a second node supplying a fourth reference voltage. The third and fourth reference voltages are carried by tapped nodes that are mirror image nodes with respect to a center tapped node of a resistor string. The third and fourth reference voltages together define the frequency of the output voltage.

The pulse-width modulated buck regulator of such embodiments further includes, in part, means for generating a first control signal if the voltage across the capacitor is higher than the third reference voltage, means for generating a second control signal if the voltage across the capacitor is less than the fourth reference voltage, means for enabling the capacitor to discharge in response to the first control signal, means for enabling the capacitor to charge in response to the second control signal, and means for latching the first and second control signals.

The pulse-width modulated buck regulator of such embodiments further includes, in part, means for applying a third control signal to a gate terminal of a first transistor, means for applying a fourth control signal to a gate terminal of a second transistor. The third and fourth control signals are non-overlapping signals and are responsive to changes in the first and second control signals. The drain terminal of each of the first and second transistors is coupled to a first node. The pulse-width modulated buck regulator of such embodiments further includes, in part, means for filtering a voltage signal carried by the first node so as to supply the output voltage, means for generating a reset signal if the output voltage of the voltage regulator is greater than a fifth reference voltage, means for rendering the third and fourth control signals responsive to the reset signal, means for generating a set signal if the output voltage of the voltage regulator is smaller than a sixth reference voltage, and means for rendering the third and fourth control signals responsive to the set signal.

In accordance with another embodiment of the present invention, the pulse-width modulated buck regulator, includes, in part, means for decrementing a count with each transition of a clock signal if the output voltage of the buck regulator is greater than a reference voltage, means for incrementing the count with each transition of the clock signal if the output voltage of the buck regulator is smaller than the reference voltage, means for changing the duty cycle of a first signal in accordance with the count, means for generating a second signal in response to the first signal, and means for filtering the second signal to generate the output voltage. The clock signal has a frequency that is 1/N times a frequency of the first signal.

In accordance with another embodiment of the present invention, a pulse-width modulated buck regulator, includes, in part, code for decrementing a count with each transition of a clock signal if the output voltage of the buck regulator is above a first reference voltage, code for incrementing the count with each transition of the clock signal if the output voltage is below a second reference voltage, code for maintaining the count if the output voltage falls between the first and second reference voltages, and code for changing the duty cycle of a first signal in accordance with the count. The output voltage is generated in response to the first signal, and the clock signal has a frequency that is 1/N times the frequency of the first signal, where N is greater than one.

The pulse-width modulated buck regulator of such embodiments further includes, in part, code for varying one of charging time and discharging time of a capacitor in response to the count, code for supplying a current that is S1 times a reference charging current to the capacitor via at least one of M legs during a first time period thereby to decrease the charging time of the capacitor, code for sinking a current that is S2 times a reference discharging current to the capacitor via at least one of the M legs during a second time period thereby to decrease the discharging time of the capacitor. The first and second time periods do not overlap and each of S1 and S2 is smaller than one. Each of the M legs is adapted to supply current to the capacitor or sink current from the capacitor in response to a different one of binary weighted signals.

The pulse-width modulated buck regulator of such embodiments further includes, in part, code for generating the reference charging current in response to a voltage representative of the output voltage, code for generating the reference discharging current in response to the voltage representative of the output voltage, code for tapping a first node supplying a third reference voltage, and code for tapping a second node supplying a fourth reference voltage. The third and fourth reference voltages are carried by tapped nodes that are mirror image nodes with respect to a center tapped node of a resistor string. The third and fourth reference voltages together define the frequency of the output voltage.

The pulse-width modulated buck regulator of such embodiments further includes, in part, code for generating a first control signal if the voltage across the capacitor is higher than the third reference voltage, code for generating a second control signal if the voltage across the capacitor is less than the fourth reference voltage, code for enabling the capacitor to discharge in response to the first control signal, code for enabling the capacitor to charge in response to the second control signal, and code for latching the first and second control signals.

The pulse-width modulated buck regulator of such embodiments further includes, in part, code for applying a third control signal to a gate terminal of a first transistor, code for applying a fourth control signal to a gate terminal of a second transistor. The third and fourth control signals are non-overlapping signals and are responsive to changes in the first and second control signals. The drain terminal of each of the first and second transistors is coupled to a first node. The pulse-width modulated buck regulator of such embodiments further includes, in part, code for filtering a voltage signal carried by the first node so as to supply the output voltage, code for generating a reset signal if the output voltage of the voltage regulator is greater than a fifth reference voltage, code for rendering the third and fourth control signals responsive to the reset signal, code for generating a set signal if the output voltage of the voltage regulator is smaller than a sixth reference voltage, and code for rendering the third and fourth control signals responsive to the set signal.

In accordance with another embodiment of the present invention, the pulse-width modulated buck regulator, includes, in part, code for decrementing a count with each transition of a clock signal if the output voltage of the buck regulator is greater than a reference voltage, code for incrementing the count with each transition of the clock signal if the output voltage of the buck regulator is smaller than the reference voltage, code for changing the duty cycle of a first signal in accordance with the count, code for generating a second signal in response to the first signal, and code for filtering the second signal to generate the output voltage. The clock signal has a frequency that is 1/N times a frequency of the first signal.

DETAILED DESCRIPTION OF THE INVENTION

Figure 1:
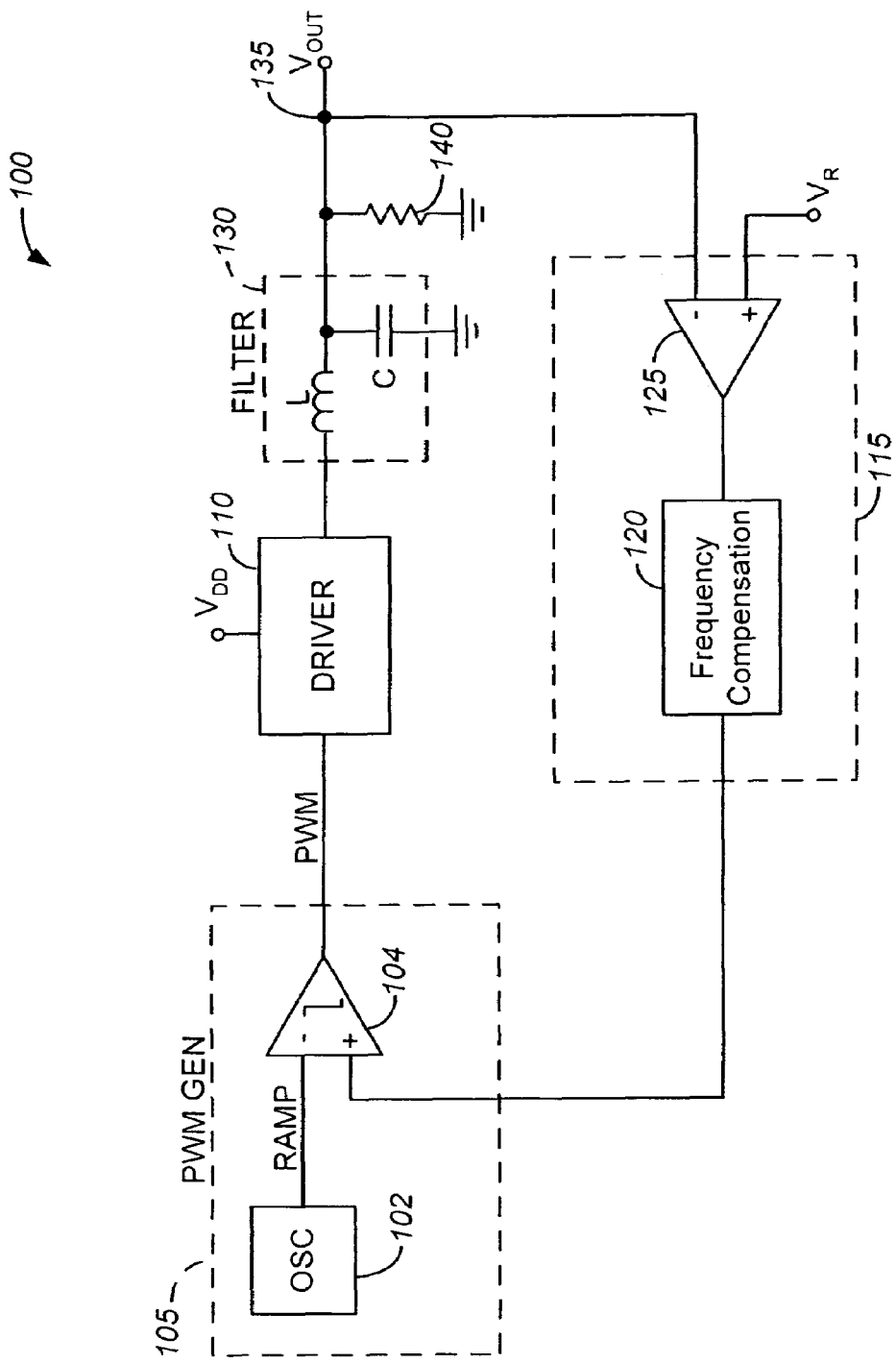
FIG. 1 is a simplified block diagram of a pulse-width modulated buck regulator, as known in the prior art.
Figure 2:
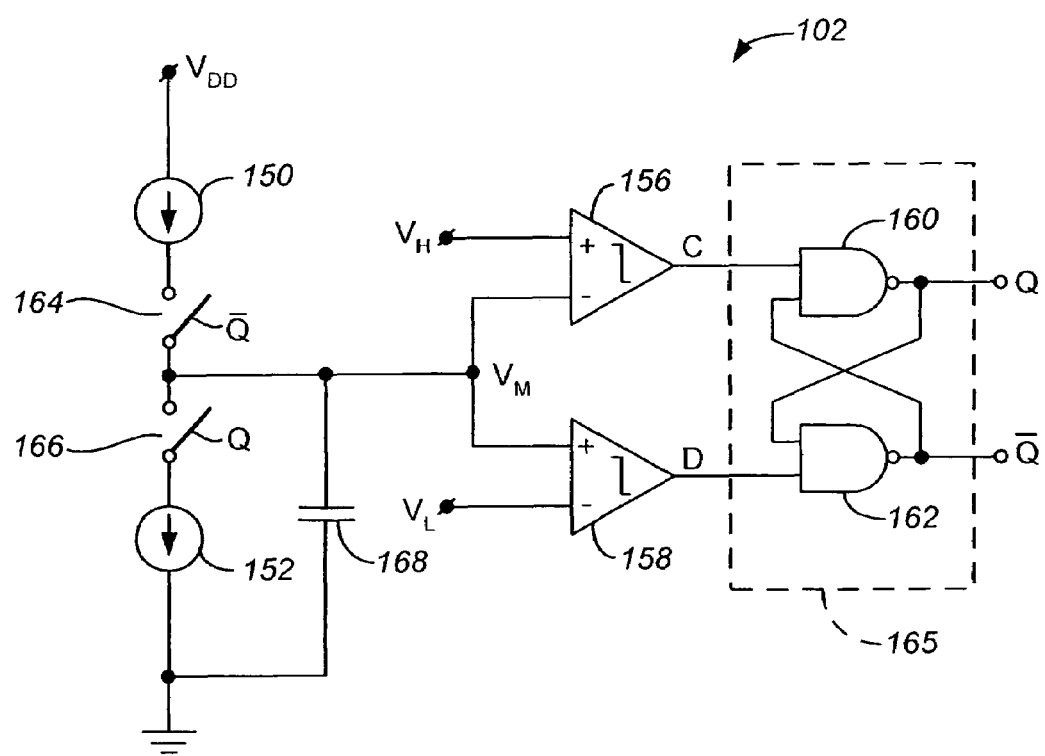
FIG. 2 is a simplified block diagram of the oscillator disposed in the pulse-width modulated buck regulator of FIG. 1, as known in the prior art.
Figure 3A:
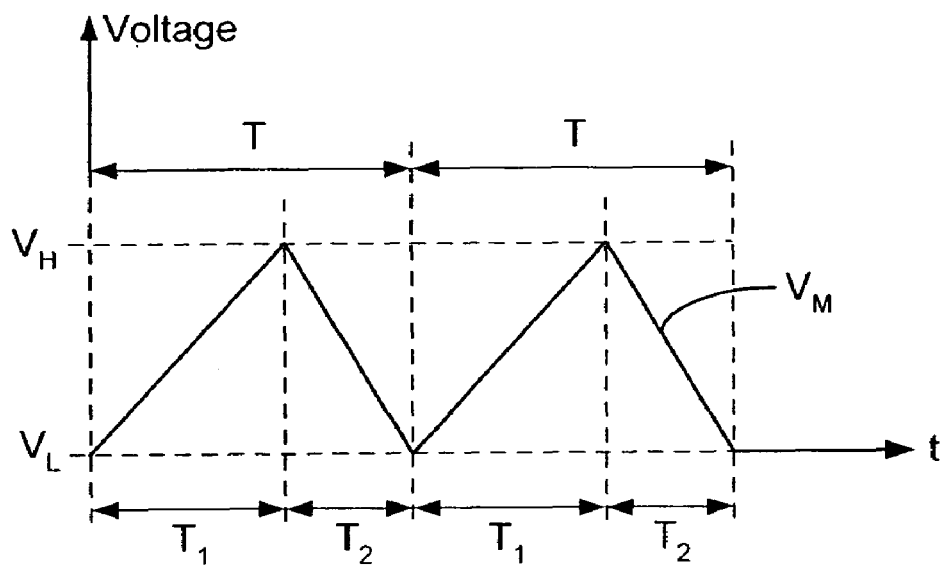
FIGS. 3A and 3B are timing diagrams of a number of signals associated with the oscillator of FIG. 2.
Figure 3B:
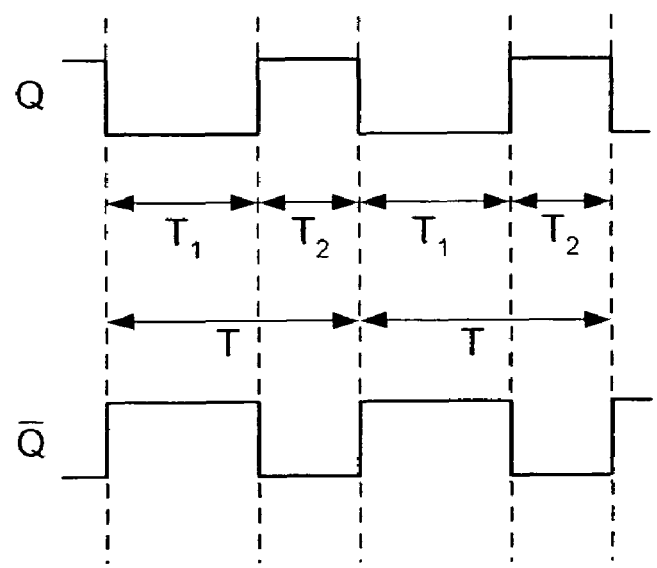
Figure 4:
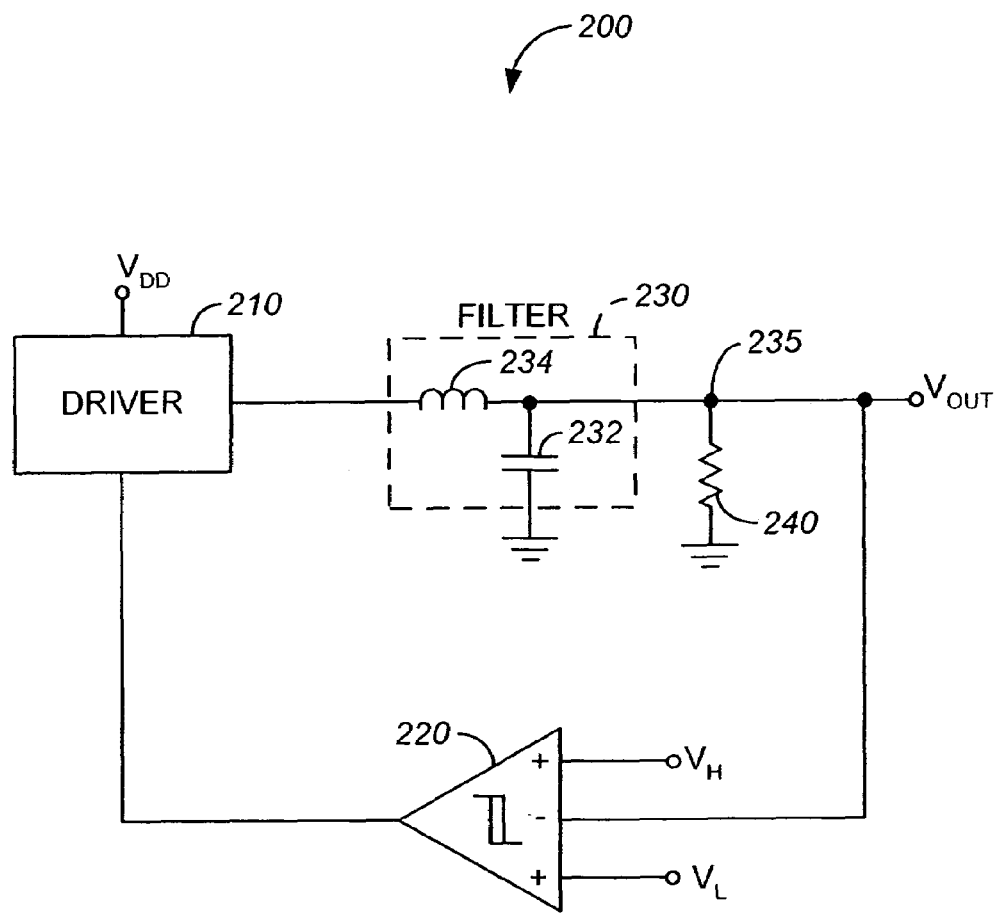
FIG. 4 is a simplified high-level block diagram of a hysteretic pulse-width modulated buck regulator, as known in the prior art.
Figure 5A:
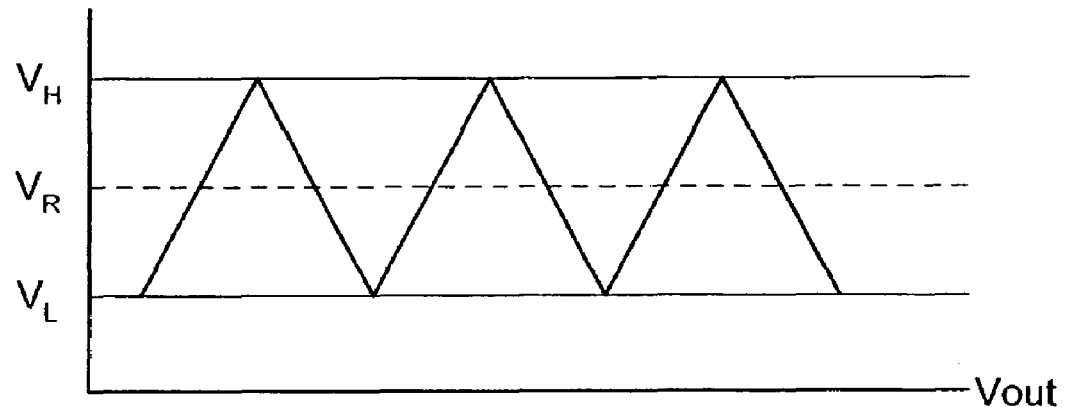
FIGS. 5A and 5B are timing diagrams of the voltage generated by the pulse-width modulated hysteretic buck regulator of FIG. 4.
Figure 5B:
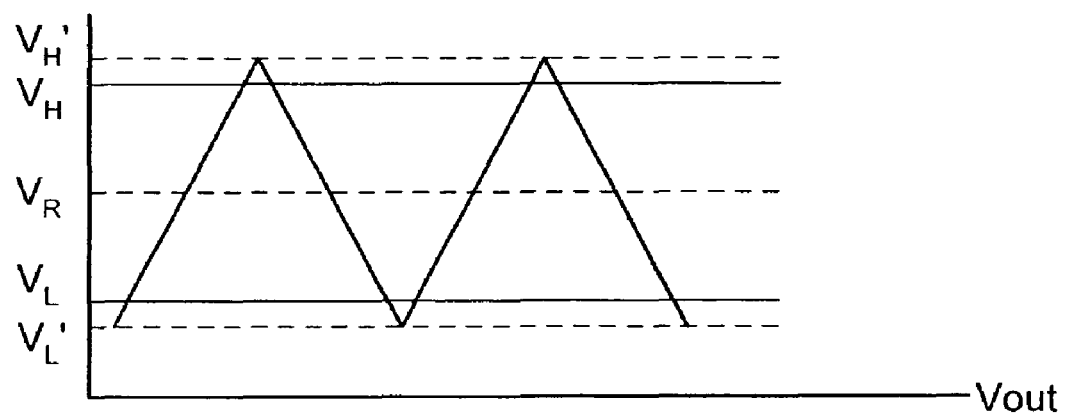
Figure 6:
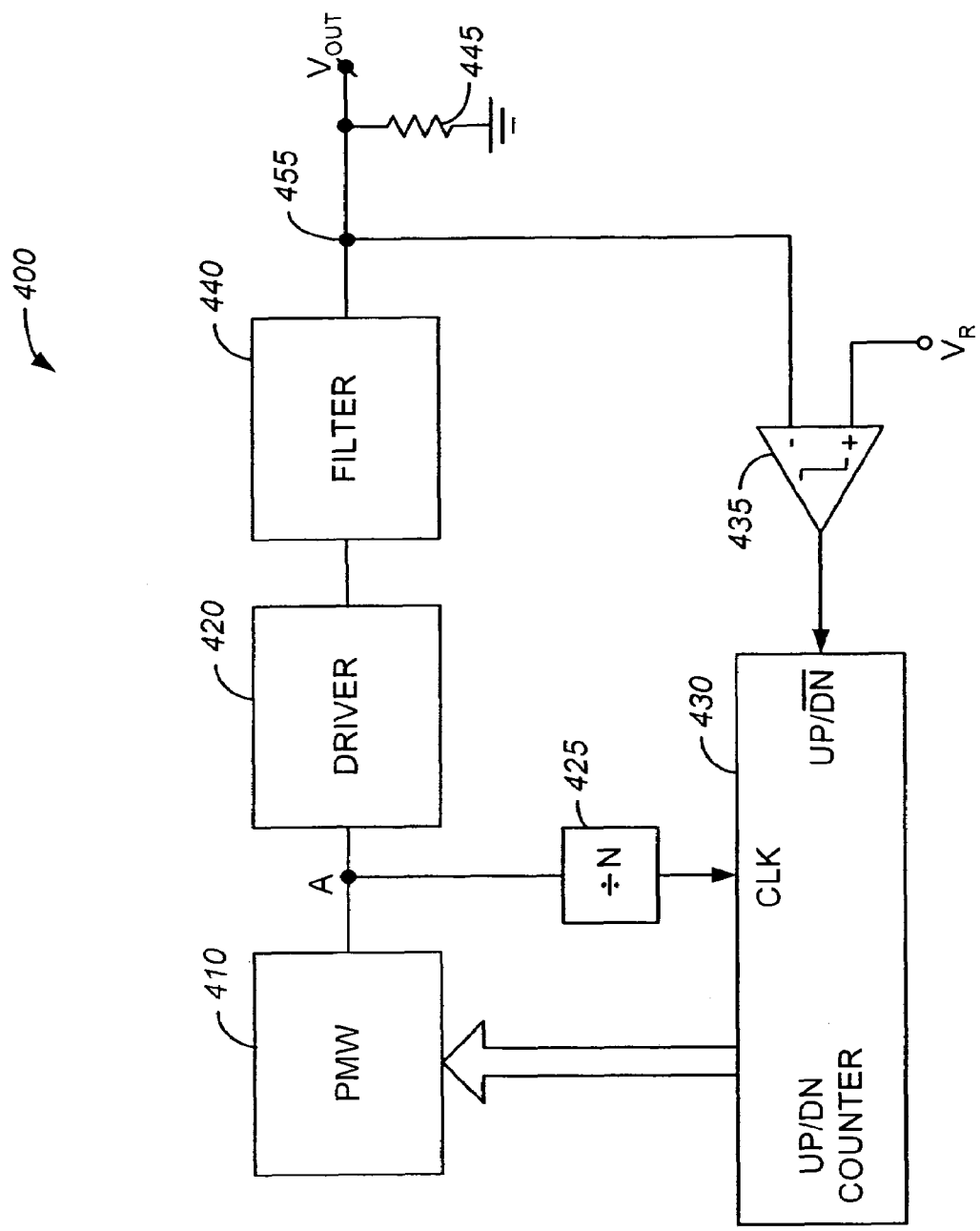
FIG. 6 is a simplified high-level block diagram of a pulse-width modulated buck regulator, in accordance with one embodiment of the present invention.

FIG. 6 is a simplified high-level block diagram of a PWM buck regulator 400, in accordance with one embodiment of the present invention. PWM buck regulator (hereinafter alternatively referred to as regulator) 400 is shown as including, in part, a pulse-width modulated signal generator 410, a driver 420, a divider 425, an up/down counter 430, and a voltage comparator 435.

If output voltage $V_{OUT}$ is greater than reference voltage $V_R$, comparator 435 generates a logic low signal causing up/down counter to be placed in the countdown mode. When placed in the countdown mode, with each rising or falling transition of clock signal Clk, counter 430's count is decremented, thereby decreasing the duty cycle of signal A generated by pulse-width modulated signal generator 410. Counter 430 continues to count down continues until voltage $V_{OUT}$ falls below reference voltage $V_R$. When voltage $V_{OUT}$ is less than reference voltage $V_R$, comparator 435 generates a logic high signal causing up/down counter to be placed in the countup mode. When placed in the countup mode, with each rising or falling transition of clock signal Clk, counter 430's count is incremented, thereby increasing the duty cycle of signal A. Counter 430 continues to count up until voltage $V_{OUT}$ exceeds reference voltage $V_R$. The countup, countdown cycles are continuously repeated. Accordingly, regulator 400 is configured to operate as a PWM power digital-to-analog converter (DAC) that converts a digital word—generated at the output of up/down counter 430—to a DC voltage that is supplied as voltage $V_{OUT}$ across resistive load 445. Output voltage $V_{OUT}$ switches between two DC voltage levels, which are apart by one least significant bit (LSB) of the PWM power DAC 400, and are centered about reference voltage $V_R$.

The clock signal applied to up/down counter 430 is generated by dividing the frequency of signal A. This ensures that signal $V_{OUT}$ substantially settles to its new value before up/down counter 430 is clocked. In other words, up/down counter 430 is clocked only after DC voltage signal $V_{OUT}$ settles to its new value and transient fluctuations of this signal are dissipated. Since signal $V_{OUT}$ is provided with sufficient time to settle before the up-down counter is clocked, comparator 435 is adapted not to switch state prematurely thus eliminating instability in the feedback loop. Therefore, no additional frequency compensation circuitry is needed if output node 455 receives inductive and/or capacitive load in addition to resistive load 445.

Figure 7:
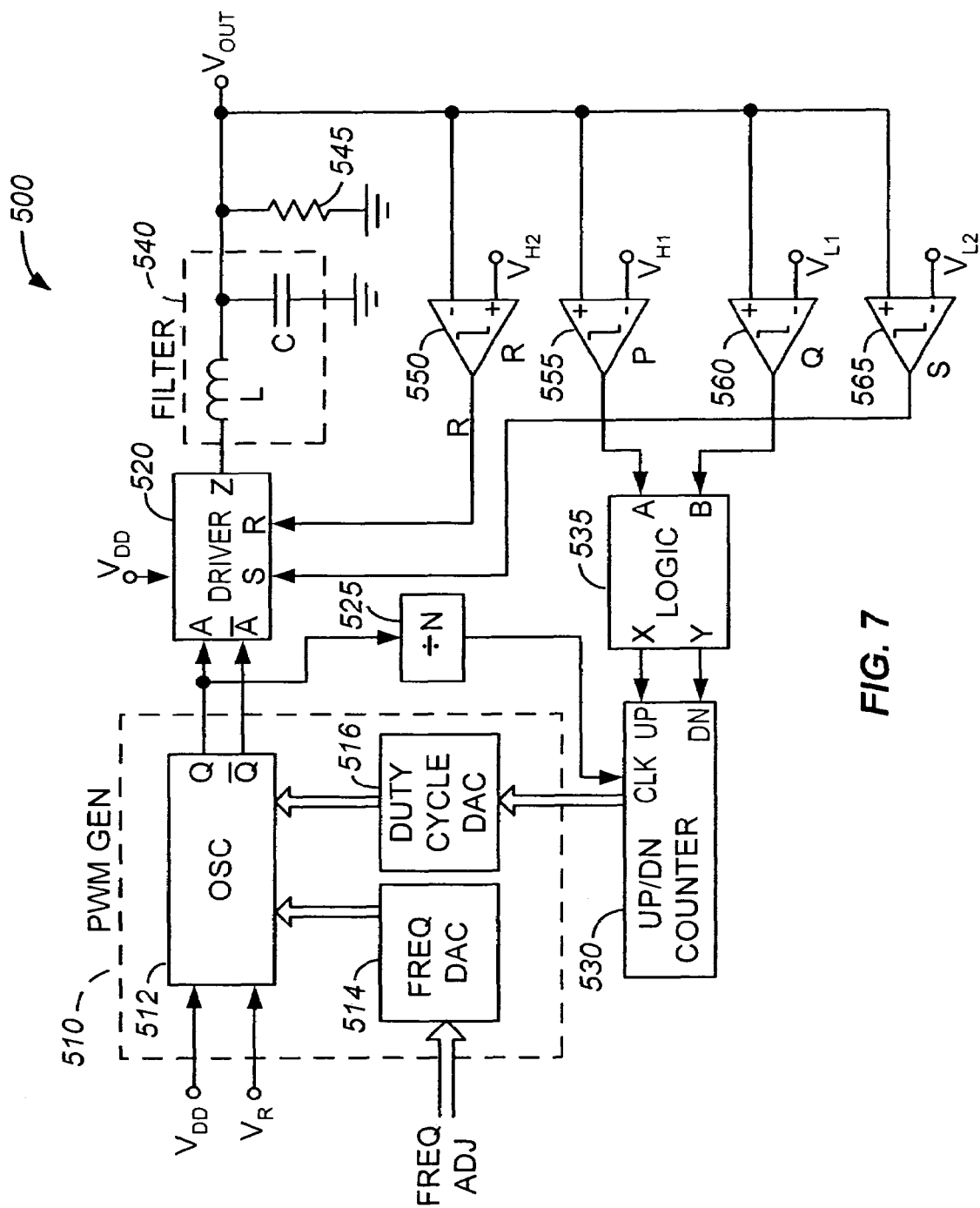
FIG. 7 is a simplified high-level block diagram of a pulse-width modulated buck regulator, in accordance with another embodiment of the present invention.

FIG. 7 is a simplified high-level block diagram of a PWM buck regulator 500, in accordance with another embodiment of the present invention. Regulator 500 is shown as including, in part, a pulse-width modulated signal generator 510, a driver 520, a divider 525, an up/down counter 530, a control logic 535, and a multitude of comparators 550, 555, 560, and 565. Filter 540 may be external to regulator 500.

As seen from FIG. 7, PWM signal generator 510 includes an oscillator 512, a frequency DAC 514 configured to control the frequency of signals Q and $\overline{Q}$ generated by PWM signal generator 510, as well as a duty cycle DAC 516 configured to control the duty cycle of signals Q and $\overline{Q}$.

If output voltage $V_{OUT}$ is greater than reference voltage $V_{H1}$ applied to the negative input terminal of comparator 555, control logic 535 places up/down counter 530 in the countdown mode in response to the output signal generated by comparator 555. When placed in the countdown mode, with each rising or falling transition of clock signal Clk, counter 530's count is decremented, thereby decreasing the duty cycle of signal Q. Counter 530 continues to count down until voltage $V_{OUT}$ falls below reference voltage $V_{H1}$. Parameter $V_{H1}$ may be defined as:

$$V_{H1} = V_R + \Delta V$$

where $\Delta V$ is a small fraction of $V_R$.

When voltage $V_{OUT}$ is less than reference voltage $V_{L1}$ applied to the negative input terminal of comparator 560, control logic 535 places up/down counter 530 in the countup mode in response to the output signal generated by comparator 560. When placed in the countup mode, with each rising or falling transition of clock signal Clk, counter 530's count is incremented, thereby increasing the duty cycle of signal Q. Counter 530 continues to count up until voltage $V_{OUT}$ exceeds reference voltage $V_{L1}$. If voltage $V_{OUT}$ is greater than voltage $V_{L1}$ but smaller that voltage $V_{H1}$, control logic 535 disables counter 530 so as to inhibit any change in the duty cycle of signals Q and $\overline{Q}$. Accordingly, fluctuations (ripple) on output voltage signal $V_{OUT}$ due to switching of comparators 555 and 560 are minimized. Filter 540 may be adapted so as to further reduce any fluctuations that may appear on output voltage signal $V_{OUT}$ due to factors such as the switching speed of regulator 500. This enables regulator 500 to have an output voltage ripple characteristics that is similar to that of a linear voltage regulator. Parameter $V_{L1}$ may be defined as:

$$V_{L1} = V_R - \Delta V$$

The clock signal applied to up/down counter 530 is generated by dividing the frequency of signals Q or $\overline{Q}$. This ensures that signal $V_{OUT}$ settles to its new value before up/down counter 530 is clocked again. In other words, up/down counter 530 is clocked only after DC voltage signal $V_{OUT}$ settles to its new value and transient fluctuations of this signal are dissipated. Since signal $V_{OUT}$ is provided with sufficient time to settle before up-down counter 530 is clocked, the feedback loop remains stable.

As is known, voltage $V_{OUT}$ may vary in response to variations in supply voltage $V_{DD}$ as well as the variations in resistive losses or voltage-drops that may be present in driver 520 or filter 540. In accordance with the present invention, compensation of voltage signal $V_{OUT}$ due to resistive losses that may be present in driver 520 or filter 540 is carried out via the feedback loop. Moreover, a compensation circuit, described below, may further be used to compensate for changes in output voltage $V_{OUT}$ due to supply voltage $V_{DD}$.

Figure 8:
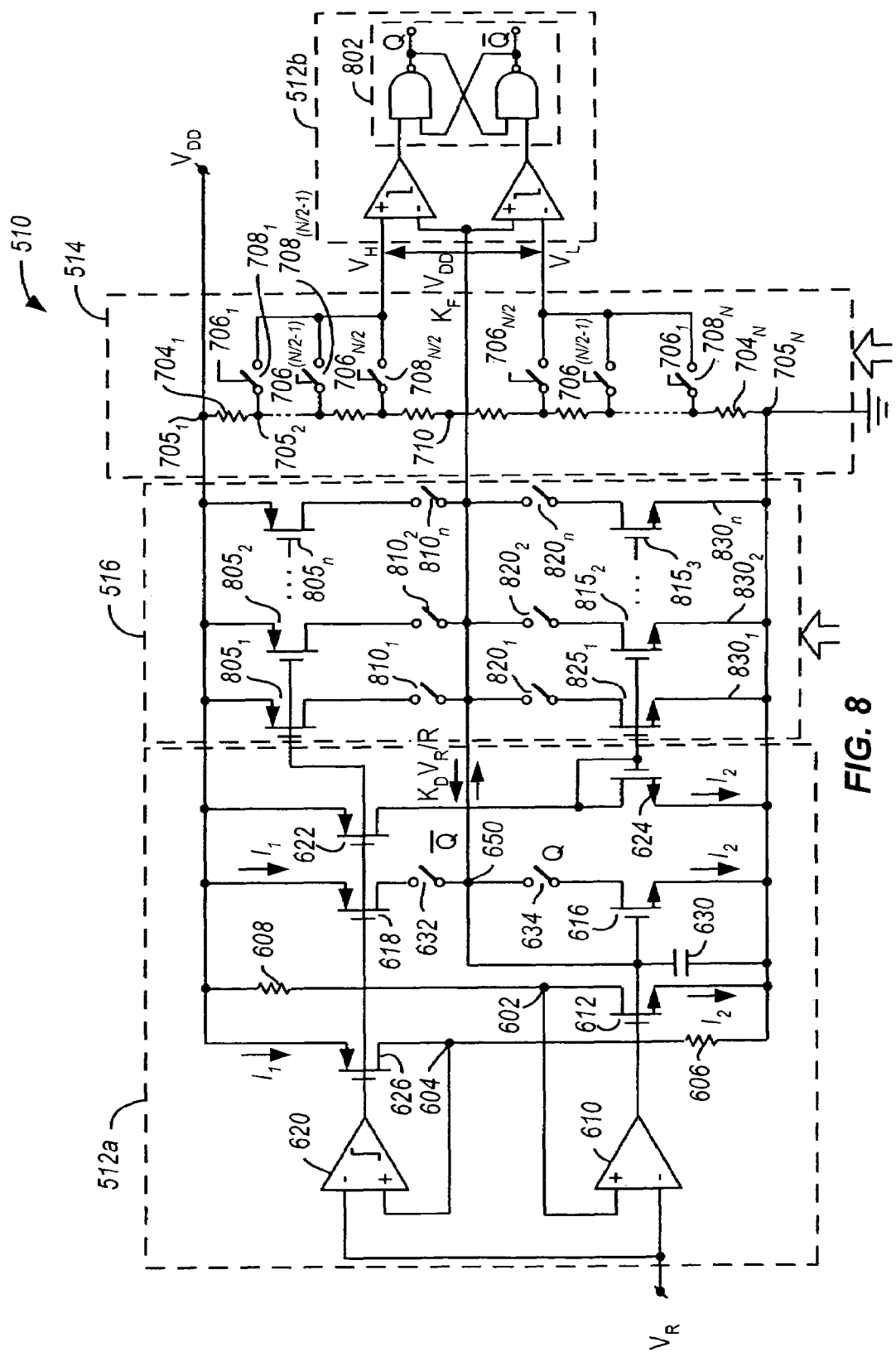
FIG. 8 is a transistor/block diagram of the pulse-width modulated signal generator shown in FIG. 7, in accordance with one embodiment of the present invention.

FIG. 8 is a transistor/block diagram of PWM signal generator 510 of FIG. 7. Blocks 512a and 512b together form input and out stage of oscillator 512 of FIG. 7. The currents that charge or discharge capacitor 630 are adapted so as to compensate for duty cycle variations induced by variations in supply voltage $V_{DD}$. Reference voltages $V_H$ and $V_L$ are generated using frequency DAC 514 and may be varied via switches $708_1$, $708_2$ ... $708_N$ that selectively receive and deliver voltages present on N tapped nodes that divide resistor 704 into (N+1) equal resistive segments, as shown in FIG. 8.

Amplifiers 610 and 620 respectively maintain nodes 602 and 604 at reference voltage $V_R$. Assuming that resistors 606 and 608 each have a resistance of R, current $I_1$ flowing through resistor 606 and transistor 626 is defined by the following equation:

$$I_1 = \frac{V_R}{R}$$

Similarly, current $I_2$ flowing through resistor 608 and transistor 612 is defined by the following equation:

$$I_2 = \frac{V_{DD} - V_R}{R}$$

Current $I_1$ is mirrored in transistor 618, and current $I_2$ is mirrored in transistor 616. Signals Q and $\overline{Q}$ generated by latch 802 disposed in output stage 512b are respectively applied to switches 632 and 634 disposed in input stage 512a.

Duty cycle control DAC 516 include N current legs, $830_1$, $830_2$ ... $830_N$. Each leg $830_i$, where i is an integer varying from 1 to N, includes a transistor $805_i$ adapted to source current to capacitor 630 via an associated switch $810_i$, and a transistor $815_i$ adapted to sink current from capacitor 630 via an associated switch $820_i$. Up/down counter 530 supplies the control signals that turn switches $810_i$ and $820_i$ on or off. Each of transistors $805_i$ is adapted to supply a current of $K_D \times I_1$ when placed in a conductive mode. Each of transistors $815_i$ is adapted to sink a current of $K_D \times I_1$ when placed in a conductive mode. In some embodiments, $K_D$ is a fractional number.

Transistor 622 ensures that the current flow through each of transistors $805_i$ is equal to a fraction of current $I_1$, and transistor 624 ensures that the current flow through each of transistors $815_i$ is equal to a faction of current $I_1$. Accordingly, duty-cycle control DAC 516 is adapted to source a binary weighted replica of current $I_1$ to charge capacitor 630, and further to sink a binary weighted replica of current $I_1$ to discharge capacitor 630.

The control signals received from up/down counter 530 are such that at any given time in each leg $830_i$, if switch $810_i$ is selected to be closed, switch $820_i$ is selected to be open, and if switch $820_i$ is selected to be closed, switch $810_i$ is selected to be open. Furthermore, when no current is required be sourced to or sunk from capacitor 630 from any of legs $830_i$, both switches $810_i$ and $820_i$ disposed in that leg $830_i$ are selected to be open. Accordingly, at any given time, one or more switches $810_i$ may be selected to be closed to supply additional current to capacitor 630, or one or more switches $820_i$ may be selected to be closed to sink additional current from capacitor 630. When no duty cycle adjustment is required, all switches $810_i$ and $820_i$ are selected to be open; therefore, during such times, only transistor 618 is adapted to charge capacitor 630, and only transistor 616 is adapted to discharge capacitor 630.

In the following, variables $T_1$ and $T_2$ respectively designate the charging time and discharging time of capacitor 630. The duty cycle is defined as below:

$$\frac{T_2}{T_1 + T_2}$$

To increase the duty cycle, charging time $T_1$ is decreased and discharging time $T_2$ is increased. To decrease charging time $T_1$, one or more switches $810_i$ are selected to be closed to increase the current supply to capacitor 630. During this time, associated switches $820_i$ are selected to be open. For example, switches $810_1$ and $810_2$ of legs $830_1$ and $830_2$ may be selected to be closed to increase the current supply to capacitor 630 thus to reduce the charging time $T_1$. To decrease the duty cycle, charging time $T_1$ is increased and discharging time $T_2$ is decreased. Accordingly, switches $810_i$ are selected to be open during the charging time. During the discharging time, one or more switches $820_i$ are selected to be closed so as to allow capacitor 630 to be discharged via one or more transistors $815_i$. The charging current and discharging current as varied by DAC 516 are defined below:

$$\left(I_1 \mp \frac{K_D \times V_R}{R}\right)$$

$$\left(I_2 \pm \frac{K_D \times V_R}{R}\right)$$

where $K_D$ is a fraction defined by the selected switches disposed in DAC 516.

Frequency control DAC 514 includes a resistor-string 704 disposed between $V_{DD}$ and ground with binary weighted taps. Each of the N resistor strings $704_1, 704_2 \ldots 704_N$ has the same resistance. Therefore, the resistor string has mirror-image symmetry about node 710 and has N tapped nodes $705_j$, where j is an integer varying 1 to N. These N tapped nodes provide N/2 pairs of voltage signals that have mirror image symmetry—are complementary voltages—with respect to the voltage at the center node 710. In other words, the voltages at nodes $705_j$ and $705_{N+1-j}$ are mirror images of one another with respect to node 710.

A logic decoder (not shown) generates N/2 decoded signals $706_k$, where k is equal to j when j varies between 1 and N/2, and k is equal to (N+1−j) when j varies between (N/2+1) and N. Decoded signal $706_k$ is applied to switch $708_j$. Accordingly, when, e.g., the voltage at tapped node $705_2$ is delivered as voltage $V_H$, the voltage at tapped node $705_{N-1}$ is delivered as voltage $V_L$. Similarly, when, e.g., the voltage at tapped node $705_3$ is delivered as voltage $V_H$, the voltage at tapped node $705_{N-2}$ is delivered as voltage $V_L$. Therefore, at any given time, only one pair of switches $708_j$ is closed to select the pair of nodes of resistor 704 defining voltages $V_H$ and $V_L$. The difference between voltages $V_H$ and $V_L$ is equal to $K_F V_{DD}$, where $K_F$ is a fraction that depends on the pair of selected nodes of resistor 704, as described above. The charging and discharging times $T_1$ and $T_2$ are defined below:

$$T_2 = \frac{C(V_H - V_L)}{I_2 \pm \frac{K_D V_R}{R}} = \frac{CK_F V_{DD}}{\frac{V_{DD} - V_R}{R} \pm \frac{K_D V_R}{R}} = \frac{K_F V_{DD}}{V_{DD} - (1 \mp K_D)V_R} RC \quad (1)$$

$$T_1 = \frac{C(V_H - V_L)}{I_1 \mp \frac{K_D V_R}{R}} = \frac{CK_F V_{DD}}{\frac{V_R}{R} \mp \frac{K_D V_R}{R}} = \frac{K_F V_{DD}}{(1 \mp K_D)V_R} RC \quad (2)$$

Using (1) and (2), the duty-cycle D is provided by the following expression:

$$D = \frac{T_2}{T} = \frac{T_2}{T_1 + T_2} = \frac{(1 \mp K_D)V_R}{V_{DD}} \quad (3)$$

Assuming there are no resistive losses in the driver 520 switches or in the inductor and capacitor components in filter 540, from expression (3), it is seen that if parameter $K_D$ is selected to be zero, voltage $V_{OUT}$ is equal to $D \times V_{DD}$. In other words, regulator 500 is configured to generate a $V_{DD}$ compensated duty cycle D. Hence, no additional circuitry is needed to keep voltage $V_{OUT}$ stable against variations in $V_{DD}$. Furthermore, regulator 500 is adapted to adjust for losses and other errors by varying $K_D$ using the feedback path. Consequently, a PWM buck regulator, in accordance with the present invention has a narrower feedback control range and requires small adjustments in the duty cycle D and, therefore, may be implemented using less hardware.

Using expressions (1) and (3), frequency F of output voltage signal is provided by the following:

$$F = \frac{1}{T_1 + T_2} = \frac{D}{T_2} = \frac{D(1-D)}{K_F}\left[\frac{1}{RC}\right]$$

Because D and (1−D) are both fractions, and as one decreases the other increases and vice versa, their product D(1−D) does not change substantially when D is varied within a limited range. Therefore, if the product RC is relatively fixed, frequency F of buck regulator does not vary substantially for small adjustments in D. However as is known, internal R and C components are subject to large tolerances. Parameter $K_F$ may thus be used to compensate for such large tolerances if the frequency of operation needs to be maintained within a narrow range.

Referring to FIG. 7, reference voltage $V_{H2}$ is applied to the positive input terminal of comparator 550, and reference voltage $V_{L2}$ is applied to negative input terminal of comparator 565. Reference voltage $V_{H2}$ is greater than reference voltage $V_{H1}$, and reference voltage $V_{L2}$ is smaller than reference voltage $V_{L1}$. Reference voltages $V_{H2}$ and $V_{L2}$ are further defined below:

$$V_{H2} = V_R + n\Delta V$$

$$V_{L2} = V_R - n\Delta V$$

where n is an integer greater than 1.

Comparators 550 and 565 are adapted to settle $V_{OUT}$ quickly and to prevent $V_{OUT}$ from transients caused by ringing of the inductive/capacitive components disposed in filter 540 that would otherwise cause $V_{OUT}$ to increase beyond $V_{H2}$ or fall below $V_{L2}$. As is known, the ringing of the LC filter may last for some period of time. As mentioned above, up/down counter 530 is not clocked until after voltage $V_{OUT}$ is allowed to settle. By controlling the settling time of $V_{OUT}$ via comparators 550 and 565, regulator 500 is provided with relatively faster response.

Figure 9:
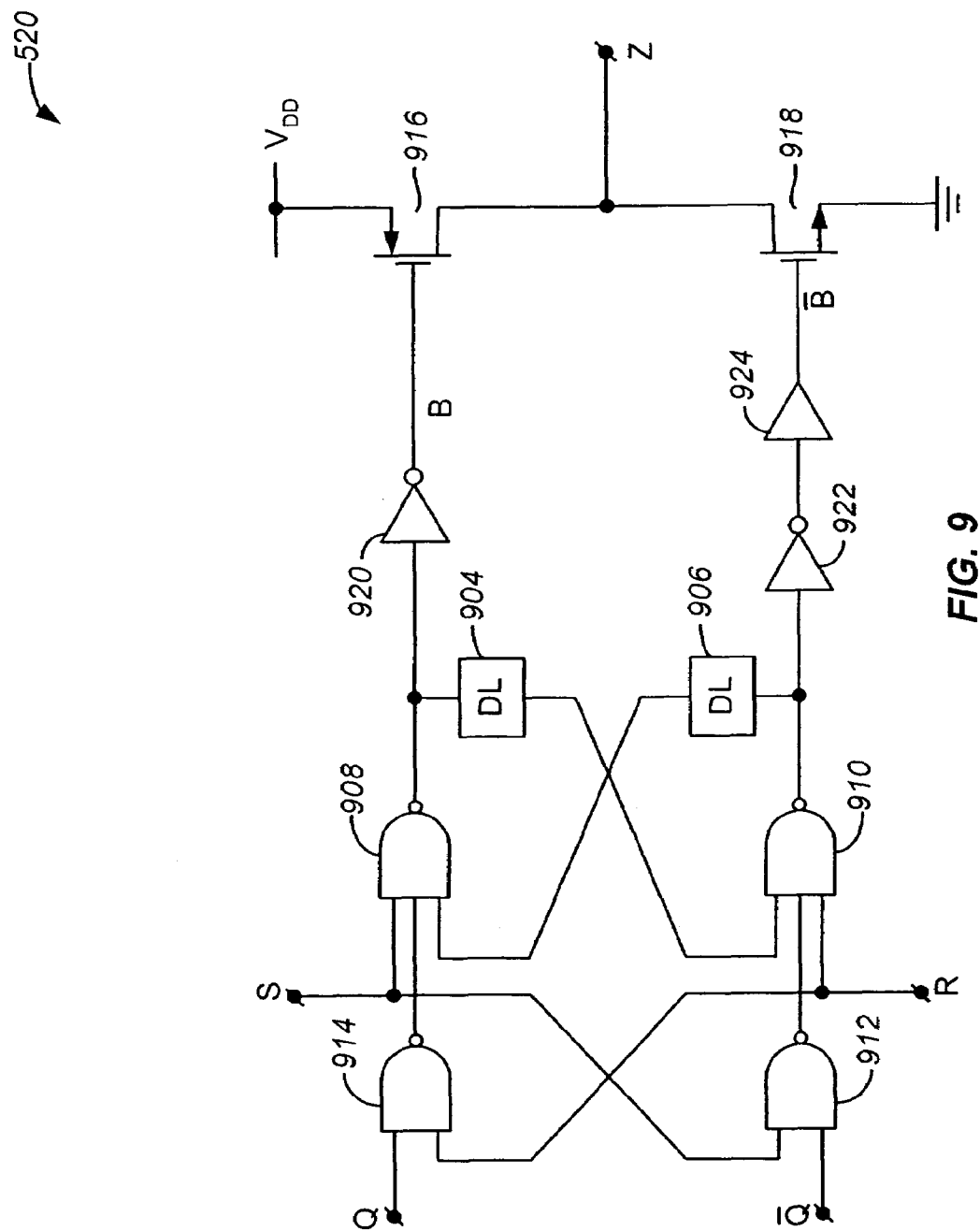
FIG. 9 is a transistor/block diagram of the driver shown in FIG. 7, in accordance with one embodiment of the present invention.

FIG. 9 shows a transistor schematic diagram of driver 520 (FIG. 7), in accordance with one embodiment of the present invention. Driver 520 is adapted to convert the output signals Q and $\overline{Q}$ that it receives from PWM signal generator 510 into two non-overlapping signals B and $\overline{B}$. Signals B and $\overline{B}$ maintain the duty-cycle of the signals Q and $\overline{Q}$. Two non-inverting delay blocks 904, 906 as well as a pair of 3-input NAND gates 908, and 910, are used, in part, to generate signals B and $\overline{B}$. Signals Q and $\overline{Q}$ are received by NAND gates 912, and 914. Inverter 920 inverts the signal supplied by NAND gate 908 to generate signal B. Inverters 922 and 924 replicate and buffer the signal received from NAND gate 910 to generate signal $\overline{B}$.

Referring concurrently to FIGS. 7 and 9, if $V_{OUT}$ is less than $V_{L2}$, comparator 565 causes set signal S to be activated thus resetting NAND gates 908, and 914. This causes PMOS transistor 916 to be on and NMOS transistor 918 to be off, which in turn, causes voltage $V_{OUT}$ to rise up relatively quickly. If voltage $V_{OUT}$ is greater than $V_{H2}$, comparator 550 causes reset signal R to be activated thus resetting NAND gates 910, and 912. This causes transistor PMOS transistor 916 to be off and NMOS transistor 918 to be on, which in turn, causes voltage $V_{OUT}$ to fall relatively quickly.

Figure 10A:
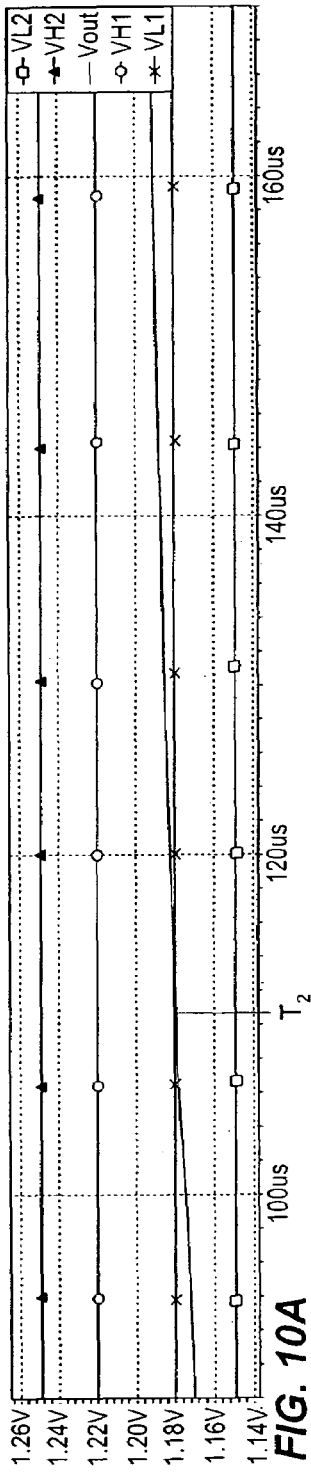
FIGS. 10A-10C are exemplary timing diagrams of a number of signals associated with the pulse-width modulated buck regulator of FIG. 9 characterized by a first set of conditions.
Figure 10B:
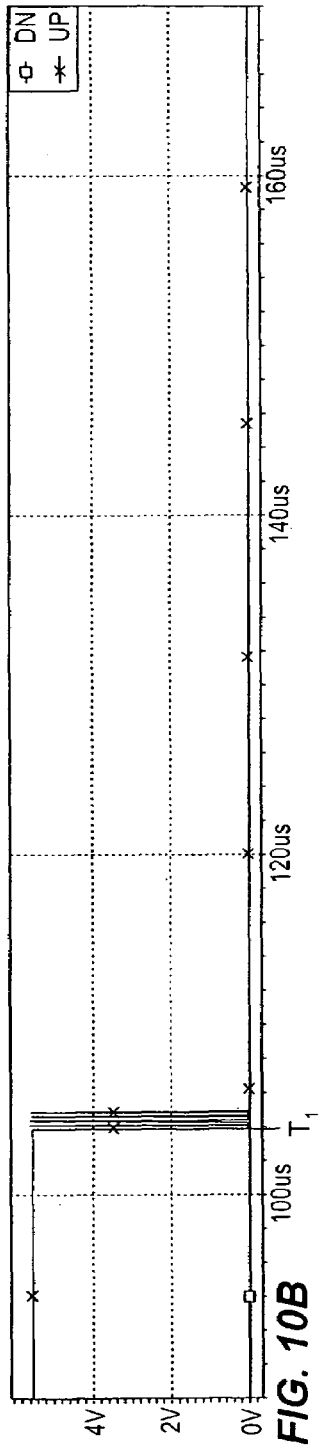
Figure 10C:
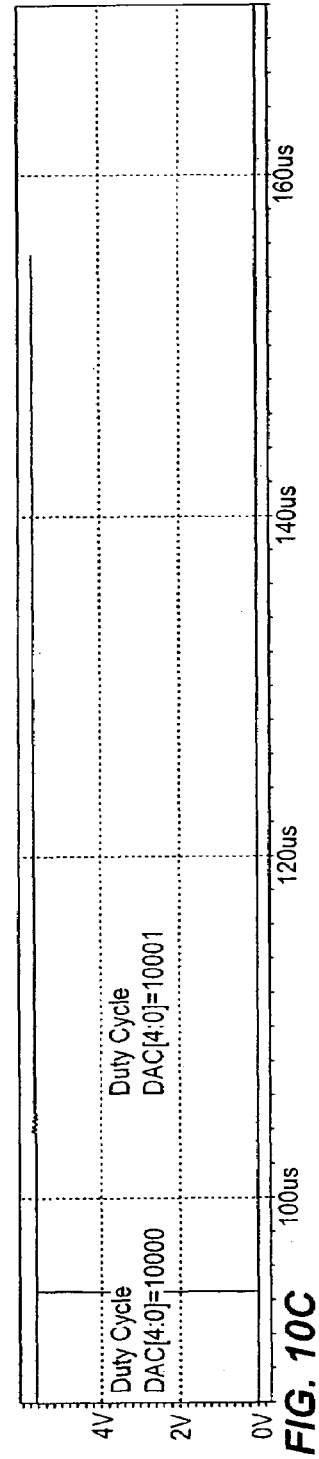

FIGS. 10-12 are computer simulation results of a number of signals associated with buck regulator 500. It is assumed that $V_{DD}$ is 5 volts and that the regulated output of the buck regulator is nearly 1.2 volts. As seen from FIG. 10A, initially voltage $V_{OUT}$ is greater than $V_{L2}$ and less than $V_{L1}$. Therefore, comparators 550 and 565 are deactivated. At time $T_1$, counter 530 is caused to increment, as shown in FIG. 10B, thereby causing the output of duty cycle DAC 516 to increase from binary 10000 to 10001, as shown in FIG. 10C. This increase is shown as causing voltage $V_{OUT}$ to rise above voltage $V_{L1}$ at time $T_2$.

Figure 11A:
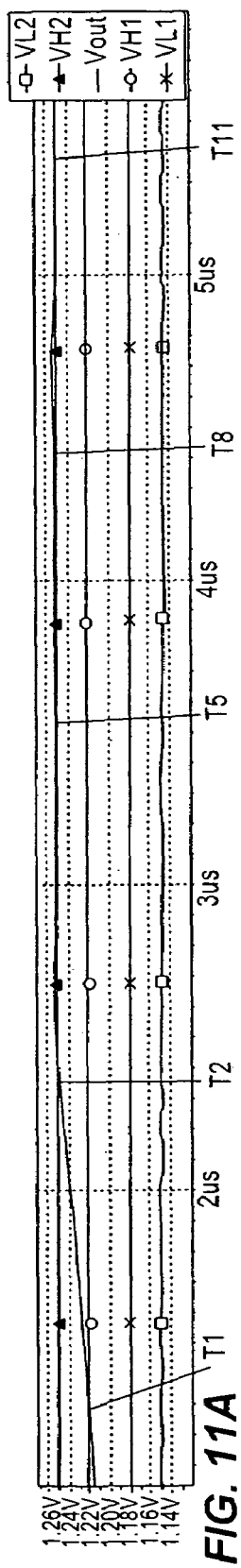
FIGS. 11A-11D are exemplary timing diagrams of a number of signals associated with the pulse-width modulated buck regulator of FIG. 9 characterized by a second set of conditions.
Figure 11B:
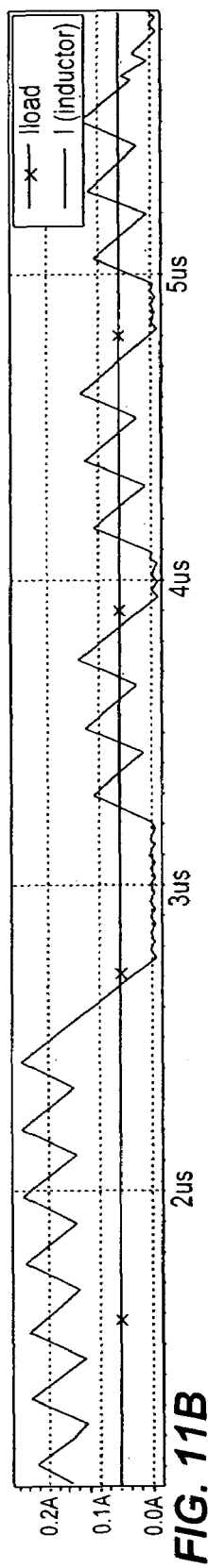
Figure 11C:
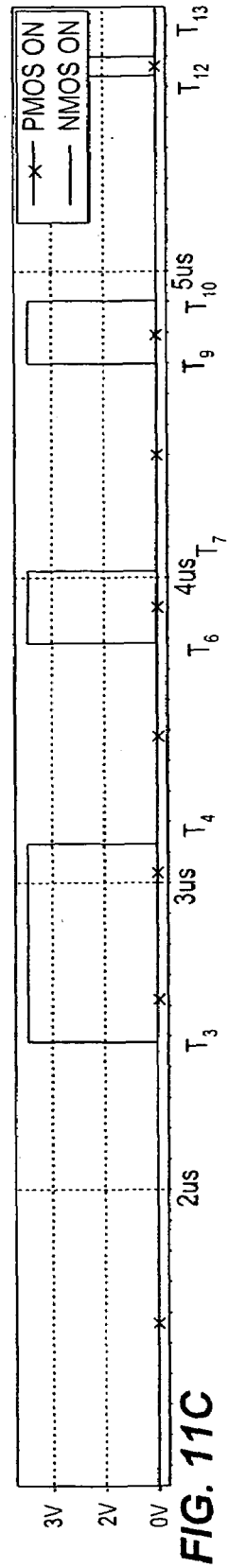
Figure 11D:
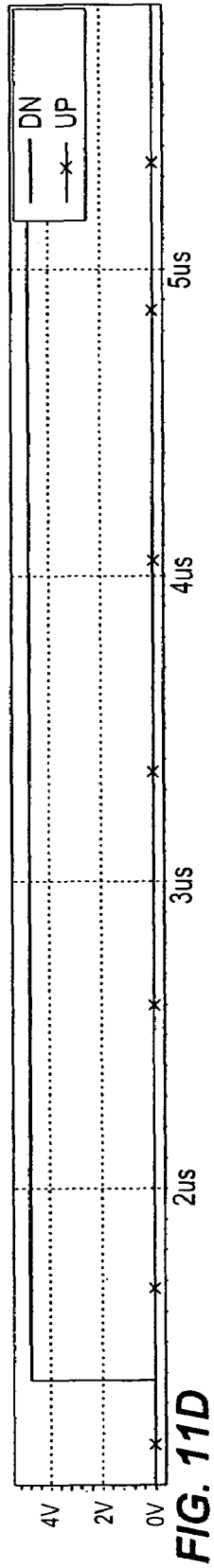

Referring to FIG. 11A, it is seen that at time $T_2$, voltage $V_{OUT}$ raises above reference voltage $V_{H2}$. FIG. 11B shows the ringing in the current that flows through the resistive load as well as the inductor disposed in filter 540. Because voltage $V_{OUT}$ exceeds reference voltage $V_{H2}$, at time $T_3$ NMOS transistor 918 (see FIG. 9) is turned on and PMOS transistor 916 is kept off to cause voltage $V_{OUT}$ to quickly settle to its new level. As seen from FIG. 11B, during the time period $T_4$-$T_3$, the ringing in the inductor is substantially reduced. Voltage $V_{OUT}$ is shown as raising above voltage $V_{H2}$ at times $T_5$, $T_8$, and $T_{11}$, causing NMOS transistor 918 to be turned on during respective periods ($T_7$-$T_6$), ($T_{10}$-$T_9$), and ($T_{13}$-$T_{12}$). During each period that transistor 916 is turned on, the ringing in the inductor current is reduced. At time $T_1$, voltage $V_{OUT}$ raises above voltage $V_{H1}$ thus causing up/down counter 530 to be set in the count-down mode, as shown in FIG. 10D.

Figure 12A:
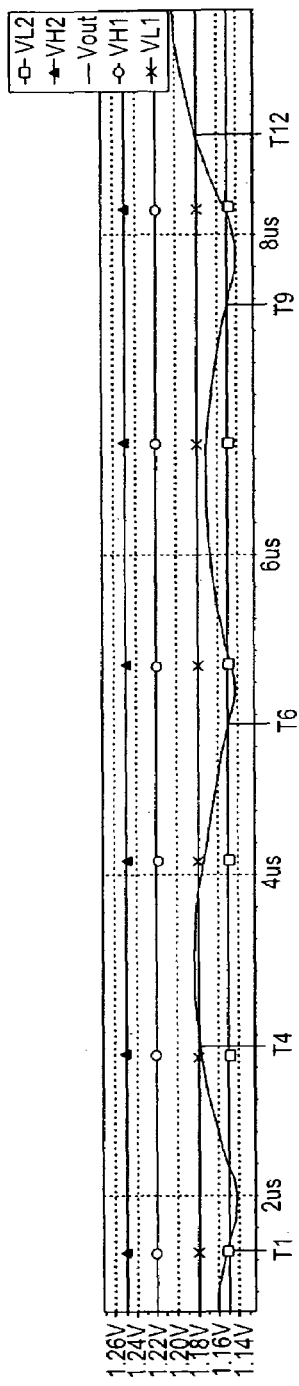
FIGS. 12A-12D are exemplary timing diagrams of a number of signals associated with the pulse-width modulated buck regulator of FIG. 9 characterized by a third set of conditions.
Figure 12B:
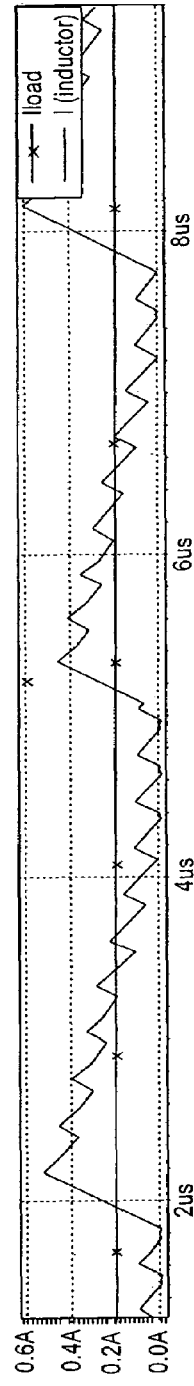
Figure 12C:
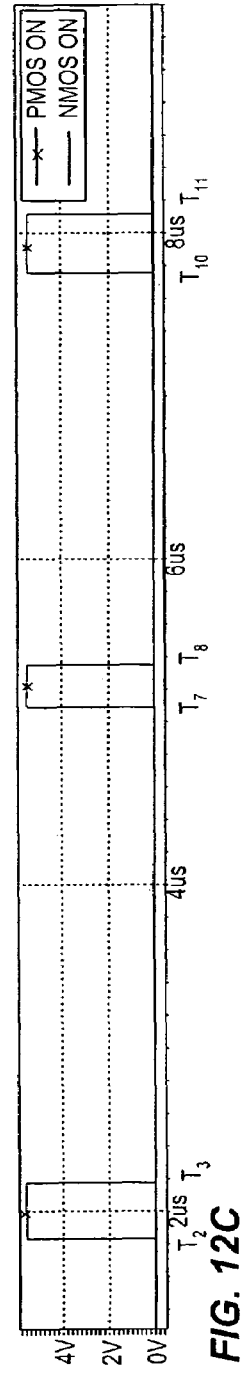
Figure 12D:
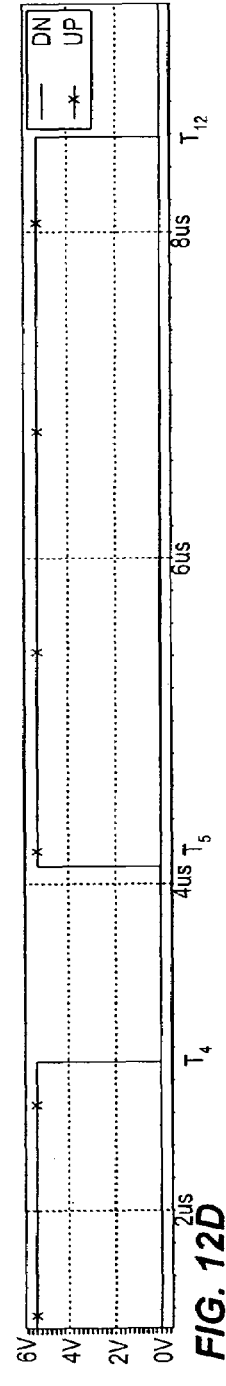

Referring to FIG. 12A, voltage $V_{OUT}$ is shown as falling below reference voltage $V_{L2}$ at times $T_1$, $T_6$ and $T_9$. In response, PMOS transistor 916 is turned on during respective periods ($T_3$-$T_2$), ($T_8$-$T_7$), and ($T_{11}$-$T_{10}$), as shown in FIG. 12C. FIG. 12B shows that the ringing in the current that flows through the resistive load as well as the inductor disposed in filter 540 is reduced during each of these periods. Because v PMOS transistor 916 is turned on during the periods ($T_3$-$T_2$), ($T_8$-$T_7$), and ($T_{11}$-$T_{10}$), voltage $V_{OUT}$ relatively quickly settles to its new value. Voltage $V_{OUT}$ is shown as being below voltage level $V_{L1}$ during all time periods except ($T_5$-$T_4$), and after time $T_{12}$. Accordingly, up/down counter 530 operates in the count-up mode until time $T_4$. During the period ($T_5$-$T_4$), up/down counter 530 is disabled. Between the periods ($T_{12}$-$T_5$), up/down counter 530 is set in the count-up mode. At time $T_{12}$, $V_{OUT}$ exceeds reference voltage $V_{L1}$, thereby disabling up/down counter 530.

Figure 13A:
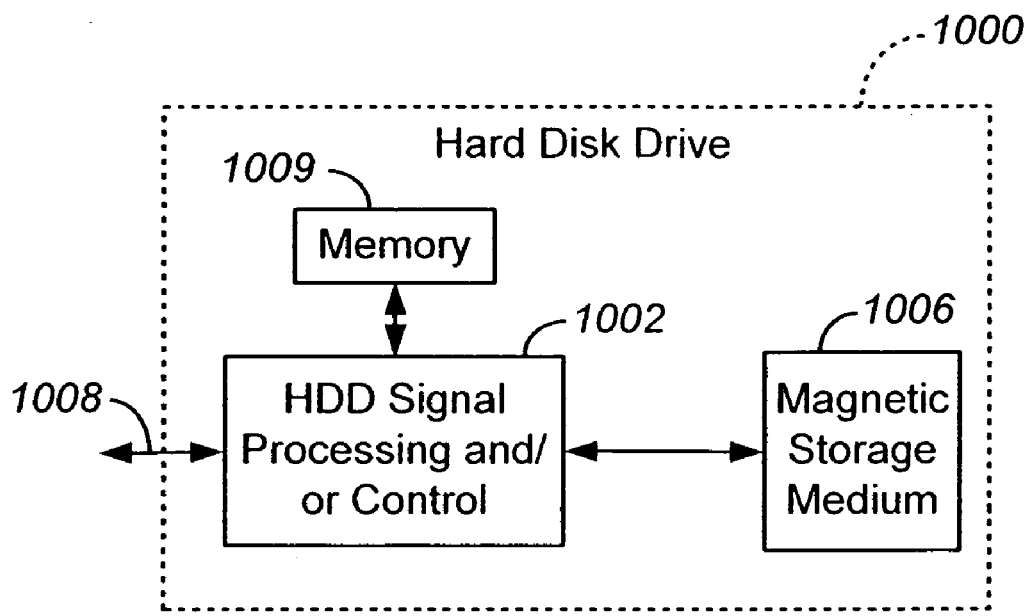
FIGS. 13A-13H show various devices in which the present invention may be embodied.

Referring now to FIGS. 13A-13G, various exemplary implementations of the present invention are shown. Referring to FIG. 13A, the present invention may be embodied in a hard disk drive 1000. The present invention may implement either or both signal processing and/or control circuits, which are generally identified in FIG. 13A at 1002. In some implementations, signal processing and/or control circuit 1002 and/or other circuits (not shown) in HDD 1000 may process data, perform coding and/or encryption, perform calculations, and/or format data that is output to and/or received from a magnetic storage medium 1006.

HDD 1000 may communicate with a host device (not shown) such as a computer, mobile computing devices such as personal digital assistants, cellular phones, media or MP3 players and the like, and/or other devices via one or more wired or wireless communication links 1008. HDD 1000 may be connected to memory 1009, such as random access memory (RAM), a low latency nonvolatile memory such as flash memory, read only memory (ROM) and/or other suitable electronic data storage.

Figure 13B:
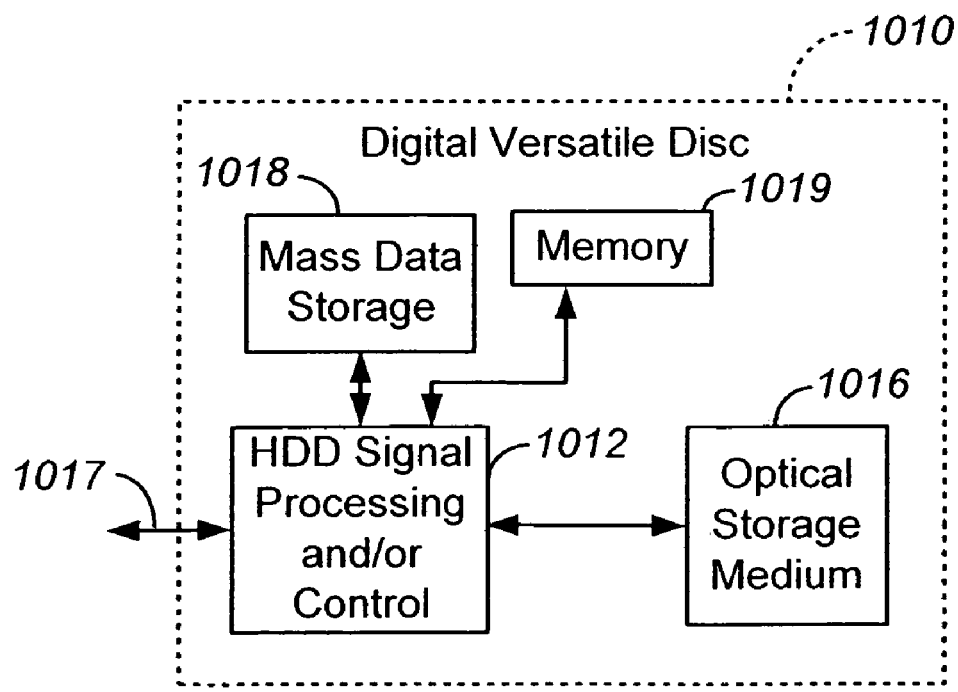

Referring now to FIG. 13B, the present invention may be embodied in a digital versatile disc (DVD) drive 1010. The present invention may implement either or both signal processing and/or control circuits, which are generally identified in FIG. 13B at 1012, and/or mass data storage 1018 of DVD drive 1010. Signal processing and/or control circuit 1012 and/or other circuits (not shown) in DVD 1010 may process data, perform coding and/or encryption, perform calculations, and/or format data that is read from and/or data written to an optical storage medium 1016. In some implementations, signal processing and/or control circuit 1012 and/or other circuits (not shown) in DVD 1010 can also perform other functions such as encoding and/or decoding and/or any other signal processing functions associated with a DVD drive.

DVD drive 1010 may communicate with an output device (not shown) such as a computer, television or other device via one or more wired or wireless communication links 1017. DVD 1010 may communicate with mass data storage 1018 that stores data in a nonvolatile manner. Mass data storage 1018 may include a hard disk drive (HDD) such as that shown in FIG. 13A. The HDD may be a mini HDD that includes one or more platters having a diameter that is smaller than approximately 1.8". DVD 1010 may be connected to memory 1019, such as RAM, ROM, low latency nonvolatile memory such as flash memory, and/or other suitable electronic data storage.

Figure 13C:
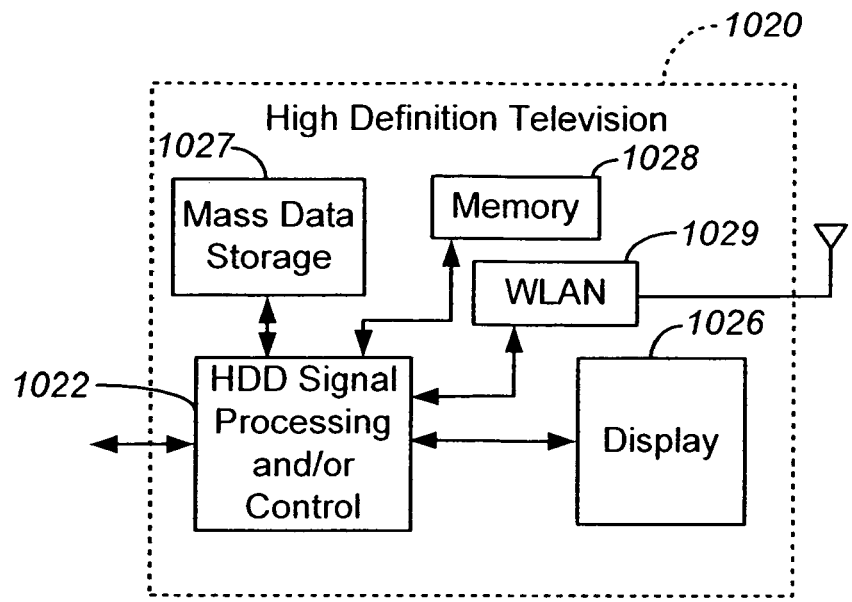

Referring now to FIG. 13C, the present invention may be embodied in a high definition television (HDTV) 1020. The present invention may implement either or both signal processing and/or control circuits, which are generally identified in FIG. 13C at 1022, a WLAN interface and/or mass data storage of the HDTV 1020. HDTV 1020 receives HDTV input signals in either a wired or wireless format and generates HDTV output signals for a display 1026. In some implementations, signal processing circuit and/or control circuit 1022 and/or other circuits (not shown) of HDTV 1020 may process data, perform coding and/or encryption, perform calculations, format data and/or perform any other type of HDTV processing that may be required.

HDTV 1020 may communicate with mass data storage 1027 that stores data in a nonvolatile manner such as optical and/or magnetic storage devices. At least one HDD may have the configuration shown in FIG. 13A and/or at least one DVD may have the configuration shown in FIG. 13B. The HDD may be a mini HDD that includes one or more platters having a diameter that is smaller than approximately 1.8". HDTV 1020 may be connected to memory 1028 such as RAM, ROM, low latency nonvolatile memory such as flash memory and/or other suitable electronic data storage. HDTV 1020 also may support connections with a WLAN via a WLAN network interface 1029.

Figure 13D:
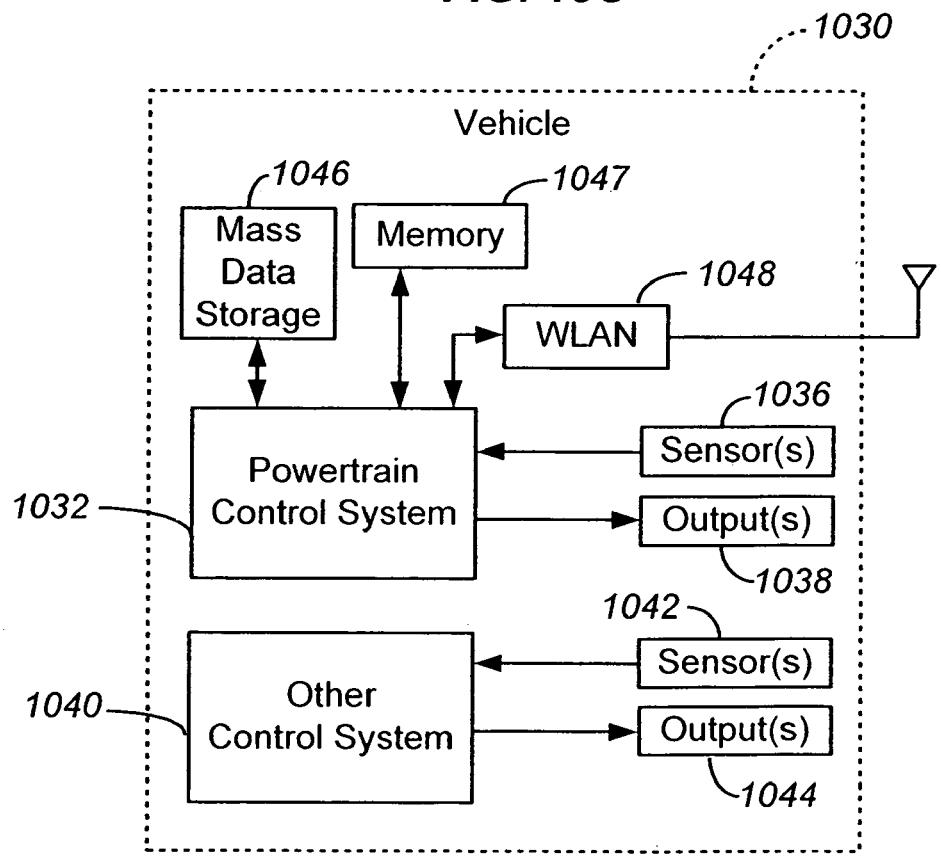

Referring now to FIG. 13D, the present invention implements a control system of a vehicle 1030, a WLAN interface and/or mass data storage of the vehicle control system. In some implementations, the present invention implements a powertrain control system 1032 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be embodied in other control systems 1040 of vehicle 1030. Control system 1040 may likewise receive signals from input sensors 1042 and/or output control signals to one or more output devices 1044. In some implementations, control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 1032 may communicate with mass data storage 1046 that stores data in a nonvolatile manner. Mass data storage 1046 may include optical and/or magnetic storage devices for example hard disk drives HDD and/or DVDs. At least one HDD may have the configuration shown in FIG. 13A and/or at least one DVD may have the configuration shown in FIG. 13B. The HDD may be a mini HDD that includes one or more platters having a diameter that is smaller than approximately 1.8". Powertrain control system 1032 may be connected to memory 1047 such as RAM, ROM, low latency nonvolatile memory such as flash memory and/or other suitable electronic data storage. Powertrain control system 1032 also may support connections with a WLAN via a WLAN network interface 1048. The control system 1040 may also include mass data storage, memory and/or a WLAN interface (all not shown).

Figure 13E:
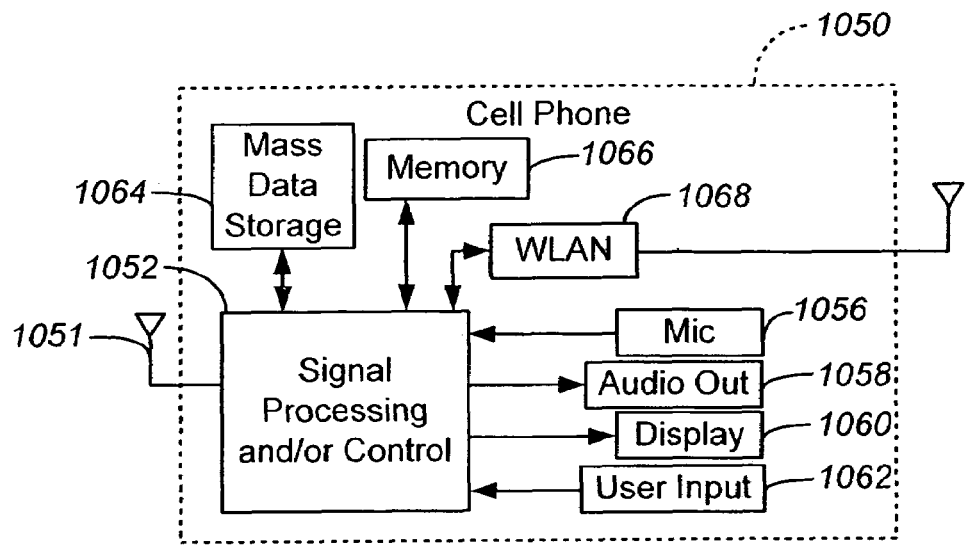

Referring now to FIG. 13E, the present invention may be embodied in a cellular phone 1050 that may include a cellular antenna 1051. The present invention may implement either or both signal processing and/or control circuits, which are generally identified in FIG. 13E at 1052, a WLAN interface and/or mass data storage of the cellular phone 1050. In some implementations, cellular phone 1050 includes a microphone 1056, an audio output 1058 such as a speaker and/or audio output jack, a display 1060 and/or an input device 1062 such as a keypad, pointing device, voice actuation and/or other input device. Signal processing and/or control circuits 1052 and/or other circuits (not shown) in cellular phone 1050 may process data, perform coding and/or encryption, perform calculations, format data and/or perform other cellular phone functions.

Cellular phone 1050 may communicate with mass data storage 1064 that stores data in a nonvolatile manner such as optical and/or magnetic storage devices for example hard disk drives HDD and/or DVDs. At least one HDD may have the configuration shown in FIG. 13A and/or at least one DVD may have the configuration shown in FIG. 13B. The HDD may be a mini HDD that includes one or more platters having a diameter that is smaller than approximately 1.8". Cellular phone 1050 may be connected to memory 1066 such as RAM, ROM, low latency nonvolatile memory such as flash memory and/or other suitable electronic data storage. Cellular phone 1050 also may support connections with a WLAN via a WLAN network interface 1068.

Figure 13F:
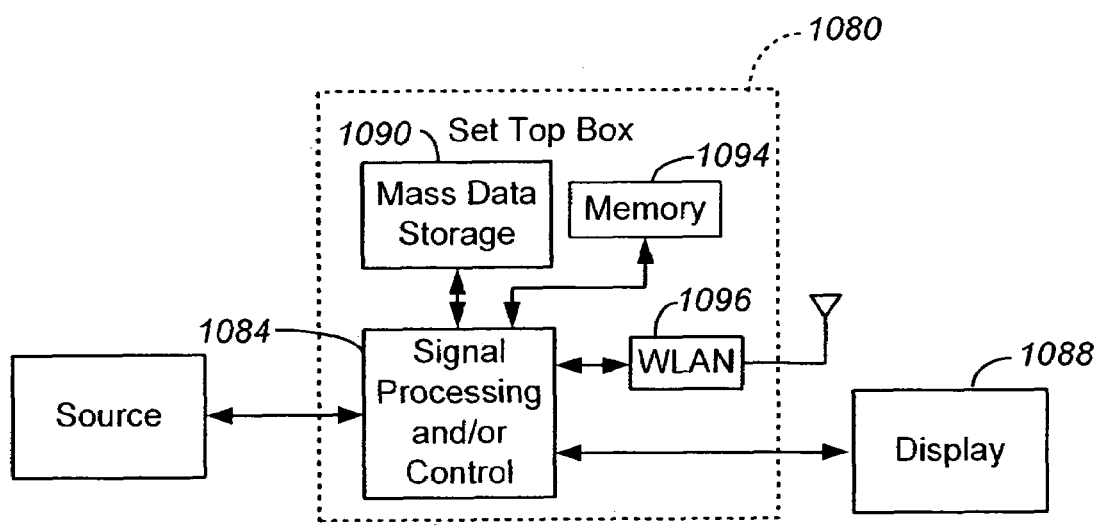

Referring now to FIG. 13F, the present invention may be embodied in a set top box 1080. The present invention may implement either or both signal processing and/or control circuits, which are generally identified in FIG. 13F at 1084, a WLAN interface and/or mass data storage of the set top box 1080. Set top box 1080 receives signals from a source such as a broadband source and outputs standard and/or high definition audio/video signals suitable for a display 1088 such as a television and/or monitor and/or other video and/or audio output devices. Signal processing and/or control circuits 1084 and/or other circuits (not shown) of the set top box 1080 may process data, perform coding and/or encryption, perform calculations, format data and/or perform any other set top box function.

Set top box 1080 may communicate with mass data storage 1090 that stores data in a nonvolatile manner. Mass data storage 1090 may include optical and/or magnetic storage devices for example hard disk drives HDD and/or DVDs. At least one HDD may have the configuration shown in FIG. 13A and/or at least one DVD may have the configuration shown in FIG. 13B. The HDD may be a mini HDD that includes one or more platters having a diameter that is smaller than approximately 1.8". Set top box 1080 may be connected to memory 1094 such as RAM, ROM, low latency nonvolatile memory such as flash memory and/or other suitable electronic data storage. Set top box 1080 also may support connections with a WLAN via a WLAN network interface 1096.

Figure 13G:
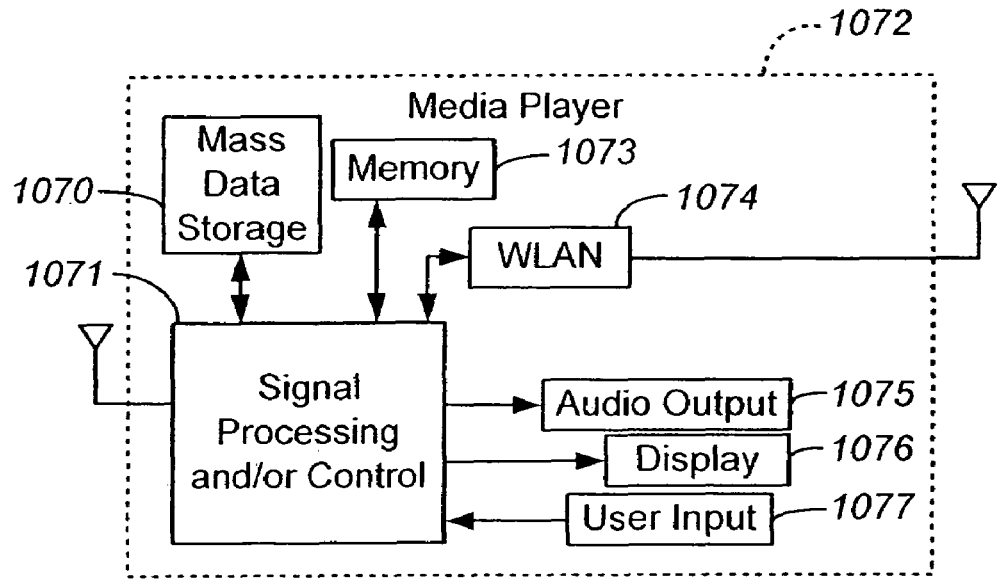

Referring now to FIG. 13G, the present invention may be embodied in a media player 1072. The present invention may implement either or both signal processing and/or control circuits, which are generally identified in FIG. 13G at 1071, a WLAN interface and/or mass data storage of the media player 1072. In some implementations, media player 1072 includes a display 1076 and/or a user input 1077 such as a keypad, touchpad and the like. In some implementations, media player 1072 may employ a graphical user interface (GUI) that typically employs menus, drop down menus, icons and/or a point-and-click interface via display 1076 and/or user input 1077. Media player 1072 further includes an audio output 1075 such as a speaker and/or audio output jack. Signal processing and/or control circuits 1071 and/or other circuits (not shown) of media player 1072 may process data, perform coding and/or encryption, perform calculations, format data and/or perform any other media player function.

Media player 1072 may communicate with mass data storage 1070 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 13A and/or at least one DVD may have the configuration shown in FIG. 13B. The HDD may be a mini HDD that includes one or more platters having a diameter that is smaller than approximately 1.8". Media player 1072 may be connected to memory 1073 such as RAM, ROM, low latency nonvolatile memory such as flash memory and/or other suitable electronic data storage. Media player 1072 also may support connections with a WLAN via a WLAN network interface 1074.

Figure 13H:
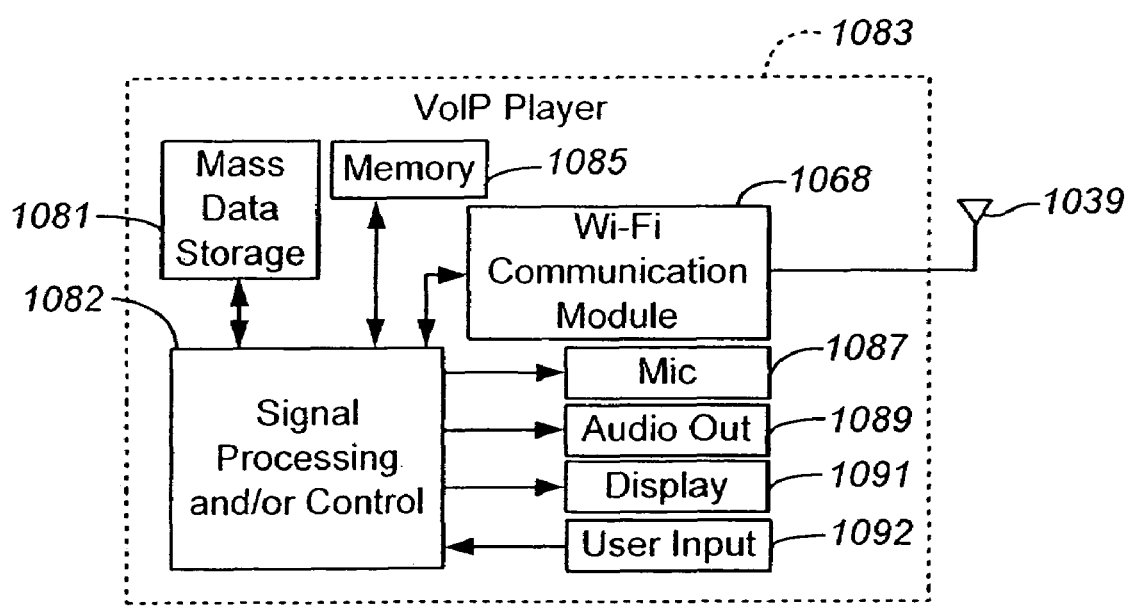

Referring to FIG. 13H, the present invention may be embodied in a Voice over Internet Protocol (VoIP) phone 1083 that may include an antenna 1039. The present invention may implement either or both signal processing and/or control circuits, which are generally identified in FIG. 13H at 1082, a wireless interface and/or mass data storage of the VoIP phone 1083. In some implementations, VoIP phone 1083 includes, in part, a microphone 1087, an audio output 1089 such as a speaker and/or audio output jack, a display monitor 1091, an input device 1092 such as a keypad, pointing device, voice actuation and/or other input devices, and a Wireless Fidelity (Wi-Fi) communication module 1086. Signal processing and/or control circuits 1082 and/or other circuits (not shown) in VoIP phone 1083 may process data, perform coding and/or encryption, perform calculations, format data and/or perform other VoIP phone functions.

VoIP phone 1083 may communicate with mass data storage 502 that stores data in a nonvolatile manner such as optical and/or magnetic storage devices, for example hard disk drives HDD and/or DVDs. At least one HDD may have the configuration shown in FIG. 13A and/or at least one DVD may have the configuration shown in FIG. 13B. The HDD may be a mini HDD that includes one or more platters having a diameter that is smaller than approximately 1.8". VoIP phone 1083 may be connected to memory 1085, which may be a RAM, ROM, low latency nonvolatile memory such as flash memory and/or other suitable electronic data storage. VoIP phone 1083 is configured to establish communications link with a VoIP network (not shown) via Wi-Fi communication module 1086. Still other implementations in addition to those described above are contemplated.

The above embodiments of the present invention are illustrative and not limitative. Various alternatives and equivalents are possible. The invention is not limited by the type of comparator, counter, pulse-width modulator, driver, or filter used. The invention is not limited by the type of amplifier used to establish the reference charging and discharging currents. The invention is not limited by the of oscillator. The invention is not limited by the type of integrated circuit in which the present disclosure may be disposed. Nor is the invention limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

What is claimed is:

1. A voltage regulator comprising:
a first comparator adapted to receive a first reference voltage;
a second comparator adapted to receive a second reference voltage;
a counter configured to be set in a count-down mode if an output voltage signal generated by the voltage regulator raises above the first reference voltage, and to be set in a count-up mode if the output voltage signal falls below the second reference voltage, wherein said counter is not incremented or decremented if the output voltage signal falls between the first and second reference voltages; wherein said counter's count is decremented with each transition of a clock signal if said counter is set in the count-down mode and wherein said counter's count is incremented with each transition of the clock signal if said counter is set in the count-up mode; and
a control circuit configured to receive the counter's count and to change, in accordance therewith, a duty cycle of a first signal to which the output voltage signal is responsive, wherein said clock signal has a frequency that is 1/N times a frequency of the first signal, and wherein N is greater than 1;
wherein the control circuit comprises a duty cycle converter configured to vary one of charging time and discharging time of a capacitor in response to the counter's count, and the duty cycle converter comprises M legs, each leg adapted to supply a current to the capacitor when a first switch disposed in that leg is selected to be closed, each leg further adapted to sink a current from the capacitor when a second switch disposed in that leg is selected to be closed, wherein said first and second switches in each leg are adapted so as not to be closed concurrently.

2. The voltage regulator of claim 1 wherein each leg further comprises a first transistor having a first terminal coupled to a first voltage supply, a second terminal coupled to a first terminal of the first switch, wherein a second terminal of the first switch in each leg is coupled to a first terminal of the capacitor.

3. The voltage regulator of claim 2 wherein each leg further comprises a second transistor having a first terminal coupled to a second voltage supply, a second terminal coupled to a first terminal of the second switch, wherein a second terminal of the second switch in each leg is coupled to the first terminal of the capacitor.

4. The voltage regulator of claim 3 further comprising a first amplifier adapted to generate a reference charging current in response to a voltage representative of the output voltage signal, wherein the current supplied by each of the M legs is a fraction of the reference charging current.

5. The voltage regulator of claim 4 further comprising a second amplifier adapted to generate a reference discharging current in response to the voltage representative of the output voltage signal, wherein the current sunk by each of the M legs is a fraction of the reference discharging current.

6. The voltage regulator of claim 1 further comprising a second control circuit adapted to vary the frequency of the output voltage signal, said second control circuit comprising:
a string of resistors disposed between a plurality of tapped nodes, each resistor having a same resistance; and
a plurality of switches adapted to deliver a first voltage signal present on a first one of the plurality of tapped nodes to a third comparator and to deliver a second voltage signal present on a second one of the plurality of tapped nodes to a fourth comparator; said third comparator generating a first control signal adapted to control the discharging of the capacitor, and said fourth comparator generating a second control signal adapted to control the charging of the capacitor.

7. The voltage regulator of claim 6 further comprising a latch configured to store the first and second control signals.

8. The voltage regulator of claim 6 further comprising a driver circuit, said driver circuit further comprising first and second transistors, said first transistor having a first terminal coupled to the first voltage supply, and a second terminal receiving a third control signal, said second transistor having a first terminal coupled to the second voltage supply, and a second terminal receiving a fourth control signal, wherein a third terminal of each of the first and second transistors are coupled to one another and supply an output signal of the driver circuit, wherein said third and fourth control signals are non-overlapping signals and are responsive to changes in the first and second control signals.

9. The voltage regulator of claim 8 further comprising a filter adapted to receive the output signal of the driver circuit, said filter generating the output voltage signal of the voltage regulator.

10. The voltage regulator of claim 9 wherein the switches disposed in each of the M legs of the duty cycle converter is responsive to a different one of M binary weighted signals.

11. The voltage regulator of claim 9 further comprising:
a logic control circuit configured to set the counter in the count-down mode in response to the output voltage being greater than the first reference voltage, and further to set the counter in the count-up mode in response to the output voltage being less than the second reference voltage.

12. The voltage regulator of claim 9 wherein said filter includes an inductor and a capacitor.

13. The voltage regulator of claim 8 further comprising a fifth comparator adapted to supply a reset signal to the driver if the fifth comparator detects that the output voltage of the voltage regulator is above a third reference voltage, the third reference voltage being greater than the first reference voltage.

14. The voltage regulator of claim 13 further comprising a sixth comparator adapted to supply a set signal to the driver if the sixth comparator detects that the output voltage of the voltage regulator is below a fourth reference voltage, the fourth reference voltage being smaller than the second reference voltage.

15. The voltage regulator of claim 14 wherein said driver circuit further comprises:
a first logic gate adapted to receive the first control signal and the reset signal;
a second logic gate adapted to receive the second control signal and the set signal;
a third logic gate adapted to receive an output signal of the first logic gate and the set signal; and
a fourth logic gate adapted to receive an output signal of the second logic gate and the reset signal; said fourth logic gate also adapted to receive a delayed replica of an output signal of the third logic gate; said third logic gate further adapted to receive a delayed replica of an output signal of the fourth logic gate.

16. The voltage regulator of claim 15 wherein said third control signal is inverse of the output signal of the third logic gate, and wherein said fourth control signal is in phase with the output signal of the fourth logic gate.

17. The voltage regulator of claim 1, wherein said counter is further configured to be disabled if the output voltage signal falls between the first and second reference voltages.

18. A voltage regulator comprising:
a comparator adapted to compare an output voltage of the voltage regulator with a reference voltage;
a counter configured to be set in a count-down mode if the output voltage raises above the reference voltage, and to be set in a count-up mode if the output voltage falls below the reference voltage; wherein said counter's count is decremented with each transition of a clock signal if said counter is set in the count-down mode and wherein said counter's count is incremented with each transition of the clock signal if said counter is set in the count-up mode; and
a control circuit configured to receive the counter's count and to change, in accordance therewith, a duty cycle of a first signal to which the output voltage is responsive, wherein said clock signal has a frequency that is 1/N times a frequency of the first signal;
wherein the control circuit comprises a duty cycle converter configured to vary one of charging time and discharging time of a capacitor in response to the counter's count, and the duty cycle converter comprises M legs, each leg adapted to supply a current to the capacitor when a first switch disposed in that leg is selected to be closed, each leg further adapted to sink a current from the capacitor when a second switch disposed in that leg is selected to be closed, wherein said first and second switches in each leg are adapted so as not to be closed concurrently.

19. The voltage regulator of claim 18 further comprising:
a driver circuit adapted to receive the first signal and to supply a second signal in response; and
a filter adapted to generate the output voltage in response to the second signal.

20. A method of regulating an output voltage, the method comprising:
decrementing a count with each transition of a clock signal if the output voltage is above a first reference voltage;
incrementing the count with each transition of the clock signal if the output voltage is below a second reference voltage;
maintaining the count if the output voltage falls between the first and second reference voltages;
varying one of charging time and discharging time of a capacitor in response to the count;
supplying a current that is S1 times a reference charging current to said capacitor via at least one of M legs during a first time period so as to decrease the charging time of the capacitor;
sinking a current that is S2 times a reference discharging current from said capacitor via at least one of the M legs during a second time period so as to decrease the discharging time of the capacitor; and
changing a duty cycle of a first signal in accordance with the count, wherein said output voltage is generated in response to the first signal, and wherein said clock signal has a frequency that is 1/N times a frequency of the first signal, wherein N is greater than 1;
wherein said first and second time periods do not overlap.

21. The method of claim 20 wherein each of S1 and S2 is smaller than one.

22. The method of claim 21 further comprising:
generating the reference charging current in response to a voltage representative of the output voltage.

23. The method of claim 22 further comprising:
generating the reference discharging current in response to the voltage representative of the output voltage.

24. The method of claim 20 further comprising:
tapping a first node of a resistor string supplying a third reference voltage; and
tapping a second node of the resistor string supplying a fourth reference voltage; wherein said third and fourth reference voltages are complementary voltages, and wherein said third and fourth reference voltages together define a frequency of the output voltage.

25. The method of claim 24 further comprising:
generating a first control signal if the voltage across the capacitor is higher than the third reference voltage;
generating a second control signal if the voltage across the capacitor is less than the fourth reference voltage;
enabling the capacitor to discharge in response to the first control signal; and
enabling the capacitor to charge in response to the second control signal.

26. The method of claim 25 further comprising latching the first and second control signals.

27. The method of claim 26 further comprising:
applying a third control signal to a gate terminal of a first transistor;
applying a fourth control signal to a gate terminal of a second transistor; wherein said third and fourth control signals are non-overlapping signals and are responsive to changes in the first and second control signals, wherein a drain terminal of each said first and transistor is coupled to a first node.

28. The method of claim 27 further comprising filtering a voltage signal carried by the first node, said filtered voltage representing the output voltage.

29. The method of claim 28 further comprising:
generating a reset signal if the output voltage is greater than a fifth reference voltage; and
rendering the third and fourth control signals responsive to the reset signal.

30. The method of claim 29 further comprising:
generating a set signal if the output voltage is smaller than a sixth reference voltage; and
rendering the third and fourth control signals responsive to the set signal.

31. The voltage regulator of claim 28 wherein said filtering operation is performed by an LC filter.

32. The voltage regulator of claim 20 wherein each of the M legs is adapted to supply current to the capacitor in response to a different one of M binary weighted signals.

33. The voltage regulator of claim 32 wherein each of the M legs is adapted to sink current from the capacitor in response to a different one of the M binary weighted signals.

34. A method of regulating an output voltage, the method comprising:
decrementing a count with each transition of a clock signal if the output voltage is above a reference voltage;
incrementing the count with each transition of the clock signal if the output voltage is below the reference voltage;
varying one of charging time and discharging time of a capacitor in response to the count;
supplying a current that is S1 times a reference charging current to said capacitor via at least one of M legs during a first time period so as to decrease the charging time of the capacitor;
sinking a current that is S2 times a reference discharging current from said capacitor via at least one of the M legs during a second time period so as to decrease the discharging time of the capacitor; and
changing a duty cycle of a first signal in accordance with the count, wherein said output voltage is generated in response to the first signal, wherein said clock signal has a frequency that is 1/N times a frequency of the first signal, and wherein N is greater than one; wherein said first and second time periods do not overlap.

35. The method of claim 34 further comprising:
generating a second signal in response to the first signal; and
filtering the second signal to generate the output voltage.

* * * * *